US 6,710,574 B2

(12) United States Patent
Davis et al.

(10) Patent No.: US 6,710,574 B2
(45) Date of Patent: Mar. 23, 2004

(54) REVERSIBLE DC MOTOR DRIVE INCLUDING A DC/DC CONVERTER AND FOUR QUADRANT DC/DC CONTROLLER

(75) Inventors: Anthony J. Davis, Estero, FL (US); Bonne W. Posma, Fort Myers, FL (US); Michael A. Urbassik, Menomonee Falls, WI (US)

(73) Assignee: Eaton Corporation, Cleveland, OH (US)

( * ) Notice: Subject to any disclaimer, the term of this patent is extended or adjusted under 35 U.S.C. 154(b) by 22 days.

(21) Appl. No.: 09/960,848

(22) Filed: Sep. 21, 2001

(65) Prior Publication Data

US 2003/0057916 A1 Mar. 27, 2003

(51) Int. Cl.$^7$ ............................. H02P 5/34; H02K 23/00
(52) U.S. Cl. ..................... 318/800; 318/254; 318/439
(58) Field of Search .................... 318/800, 254, 318/138, 439; 388/800, 806, 8, 815, 804, 811, 819, 821–823

(56) References Cited

U.S. PATENT DOCUMENTS

| 3,289,063 A | 11/1966 | Short |
| 3,346,771 A | 10/1967 | Sutton |
| 3,535,605 A | 10/1970 | Halvorson et al. |
| 3,548,279 A | 12/1970 | Knasinski et al. |

(List continued on next page.)

FOREIGN PATENT DOCUMENTS

WO    WO 91/15379    10/1991

OTHER PUBLICATIONS

Shannon, R., et al., "IGBTs to Replace SCRs and Other Motor–Controls on Underground Mining Vehicles", Coal Today, Dec., 1994, pp. 14–15.

Masek, R.J., "Thyristor Hoist Control for D–C Series Motors", AISE Reference Handbook for EOT Cranes, vol. 2—Electrical, pp. 361–364.

Cutler–Hammer Crane and Hoist Control, Technical Information Publication GH95, "Static Dc Adjustable Voltage Crane Control Regenerative, 3 Phase, Four Quadrant, Full Wave, Static Reversing, With Digital Speed Regulator NEMA Service Classification I", Jan. 2, 1988, pp. 1–15.

Bartos, Frank J., "DC Adjustable Speed Drives Accentuate the Positive to Compete", Control Engineering, Jun. 1988, pp. 60–63.

EC&M, Using DC Drives In Automated Cranes, Jun., 1987, pp. 74–77.

Bartos, Frank. J., DC Adjustable Speed Drives Accentuate the Positive to Compete, Control Engineering, Jun. 1988, pp. 60–63.

*Primary Examiner*—Robert Nappi
*Assistant Examiner*—Patrick Miller
(74) *Attorney, Agent, or Firm*—John A. Kastelic; Martin J. Moran

(57) ABSTRACT

A reversible DC motor drive includes a DC/DC converter having a DC input, a first output having a first pulsed DC voltage and first DC voltage value, a second output having a second pulsed DC voltage and second DC voltage value, and a third output having a third pulsed DC voltage and third DC voltage value. The first and second outputs are adapted for electrical interconnection with armature terminals of a DC motor, and the third output is adapted for electrical interconnection with a field terminal of the motor. A microprocessor routine calculates motor speed from the motor armature voltage, field current and armature current. An outer control loop for motor speed and two separately controllable inner control loops for armature and field current control the DC/DC converter responsive to the calculated motor speed and a speed reference in order to independently control the three DC voltage values.

39 Claims, 14 Drawing Sheets

U.S. PATENT DOCUMENTS

| | | |
|---|---|---|
| 3,551,771 A | 12/1970 | Risberg et al. |
| 3,553,554 A | 1/1971 | Risberg |
| 3,555,384 A | 1/1971 | Halvorson et al. |
| 3,555,385 A | 1/1971 | Risberg |
| 3,660,738 A | 5/1972 | Anderson et al. |
| 3,746,954 A | 7/1973 | Myles et al. |
| 3,906,328 A | 9/1975 | Wenrich et al. |
| 4,259,622 A * | 3/1981 | Kamenicky et al. .......... 318/86 |
| 4,385,266 A | 5/1983 | Sloan |
| 4,422,021 A | 12/1983 | Schwarz |
| 4,423,363 A | 12/1983 | Clark et al. |
| 4,468,724 A * | 8/1984 | Omae et al. .................. 363/88 |
| 4,506,200 A | 3/1985 | Datwyler et al. |
| 4,639,647 A | 1/1987 | Posma |
| 4,677,356 A | 6/1987 | Tsuneda et al. |
| 4,891,744 A * | 1/1990 | Yamamoto et al. ........... 363/89 |
| 5,274,541 A | 12/1993 | Kimura et al. |
| 5,332,954 A | 7/1994 | Lankin |
| 5,453,672 A | 9/1995 | Avitan |
| 5,789,896 A * | 8/1998 | Fischer et al. ............... 318/759 |
| 5,875,281 A | 2/1999 | Thexton et al. |
| 5,878,189 A * | 3/1999 | Lankin et al. .............. 388/801 |
| 6,041,949 A | 3/2000 | Walker et al. |
| 6,064,162 A * | 5/2000 | Bowers ....................... 318/246 |
| 6,476,315 B2 * | 11/2002 | Ganz .......................... 136/244 |

* cited by examiner

REVERSIBLE DC MOTOR DRIVE INCLUDING A DC/DC CONVERTER AND FOUR QUADRANT DC/DC CONTROLLER

BACKGROUND OF THE INVENTION

1. Field of the Invention

This invention relates to motor controllers, and, in particular, to four-quadrant control of series, compound, and shunt wound direct current (DC) motors connected to a DC power source. The invention also relates to four-quadrant control of DC motors connected to a receptive DC power supply.

2. Background Information

Since the early 1900's, current in direct current (DC) motors was controlled by switching resistors in series with the motor's armature and field in order to obtain variable speed or torque as required by a particular application. This method was wasteful of energy, and did not provide very good speed or torque regulation.

During the early 1960's, solid state controllers using SCRs or thyristors were introduced which improved efficiency as well as speed and torque control accuracy. The initial controllers were first used with DC shunt motors and AC power sources, wherein SCRs were employed in AC/DC controlled rectifier configurations with appropriate current and voltage feedback devices.

During the late 1960's, impulse-commutated SCR converters became available which controlled DC motor current and/or voltage when connected to a DC power source. These converters were used mainly for crane and electric vehicle applications powered from DC sources, such as rectified AC sources, or, in the case of some electric vehicles, on-board batteries. In the case of off-board DC power sources, equipment incorporating DC motors was connected by a shoe sliding on a powered collector, rail or overhead wire, or by trailing/festooned cables.

Since it was difficult to obtain good control with such SCR technology when used together with DC series motors during braking operations in crane hoist and railed electric vehicle applications, impulse-commutated SCR converters were mainly used with DC shunt motors in these applications. See, for example, U.S. Pat. Nos. 3,535,605; 3,551,771; 3,553,554; and 3,555,385.

Impulse-commutated SCR converters were relatively complicated low frequency devices, and bulky as a result of the requirement for commutation capacitors and/or reactors. Such converters were prone to failure under high current or fault conditions.

During the late 1970's, reliable high power semiconductor switching devices, such as bipolar junction transistors (BJTs), became available. Such BJTs were employed in DC motor controllers during the 1980's. For example, in 1985, Saftronics Inc., then located in Youngstown, N.Y., produced model 2BC-300 dual DC series motor choppers for electric vehicles, utilizing 400 A/600 V BJTs manufactured by Fuji. The motor's field and armature were in series with the BJT, and a LEM 300 A Hall Effect current transducer was employed to obtain isolated current feedback. This controller made use of the well-known "current amplification effect" to obtain high motor current during stall or low speed "break away" conditions while drawing only a fraction of the motor current from a 320 VDC supply.

In the late 1980's, an improved power switching device, the Insulated Gate Bipolar Transistor (IGBT), became available and was quickly used in many DC motor control applications, instead of BJTs. One such DC/DC controller was the IGBT-based model A 375 for DC series wound motors, as manufactured in 1989 by Saftronics Inc. of Fort Myers, Fla. This controller, rated for 320 VDC, employed an IGBT and current sensor connected in series with both the motor's armature and field as configured in the 2BC-300 dual DC series motor choppers, in order to control the motive effort of a DC series traction motor. The model A 375 was applicable to both crane hoist and travel motion control, as well as motive control for railed and rubber-tired vehicles. However, it had the disadvantage that when applied to hoist control, it was difficult to maintain suitable light hook speed control. Also, braking control during lowering was very load-dependant.

During 1995, Saminco of Fort Myers, Fla. produced the IGBT-based model A812 DC/DC controller with separate control of the DC series wound motor's field as well as armature, providing "field follower" or series motor characteristics during motoring or hoisting, and shunt motor characteristics during regenerative braking conditions. The model A 812 is widely used for railed vehicle applications. However, it is not readily suitable for crane hoist applications without significant alterations to the method of connecting the controller to the industry-standard four-terminal hoist/brake assembly via sliding shoes on collector rails.

U.S. Pat. No. 5,875,281 discloses a microprocessor controlled hoist and travel motion controller, which employs a single IGBT and current transducer in series with the hoist motor's armature and field during hoisting, as employed by the model A 375. However, unlike the model A 375, this controller provides separate field control during a "Lower Fast" mode using a second IGBT to control the motor's field. In both "Lower Slow" and "Lower Fast" modes, resistors are employed to dissipate energy generated during lowering. Although this controller employs the industry-standard four-terminal hoist assembly connections, it is only used with DC series wound motors and cannot readily provide independent field control during hoist "Raise" operations. It also requires a speed feedback device mounted on the hoist motor connected to the controller's microprocessor in order to provide good speed control. Since the hoist motor is usually mounted on a moving structure, it would be very difficult and expensive to achieve this requirement.

For travel motions, the controller of U.S. Pat. No. 5,875,281 utilizes electro-mechanical switches in the series wound motor's field to establish direction of motion of the crane. When it is desired to reverse motion when travelling in a given direction, the series motor's field connections are reversed, and mechanical energy in the moving crane is dissipated in a resistor switched into the circuit by yet another electro-mechanical switch.

Many modern crane controllers for use with DC series motors in crane hoisting and travel applications are still of the "constant potential" contactor/resistor type, with one configuration used for hoisting, and a significantly different configuration used for travel (bridge and trolley) applications. These controllers use contactors which switch under load causing arcing during load break operations. This results in contactor tip burn out which requires frequent maintenance. In addition, much energy is wasted in the resistors during control operations. Furthermore, these controllers can severely stress motor life because of high voltage and current conditions that exist with this technology. Other disadvantages of such controllers include: (1) hook speed during hoisting is highly load dependent and can be relatively very high; (2) field current during low speed dynamic lowering can be as much as 250% of rated current causing possible premature motor damage due to overheating in severe duty applications; (3) armature voltage during high speed dynamic lowering can be as much as 200% of rated voltage giving rise to the possibility of DC motor commutator arc-over; (4) the resistors waste energy and create considerable heat; (5) the load-break contactor tips are a high maintenance item; (6) control can only be achieved in steps, since there are only a finite number of switched resistor stages; (7) it could be possible to overspeed the DC series motor during very light hook duty if the crane operator inadvertently applies full voltage to the hoist motor; (8) there could exist a delay between cessation of motor current at the end of a hoist RAISE motion and the setting of the series brake due to a time delay caused by the current in the series brake windings decaying slowly through a low impedance electrical path—this could cause the load on the hook to sag; and (9) during hoisting, when the operator moves his master switch to "OFF", deceleration of hook speed is determined only by upwards mechanical inertia against the force of gravity and this can vary according to load; therefore, there will be an uncontrolled coasting period during a hoisting operation.

DC shunt motors for crane duty applications are typically employed with SCR controllers powered from three-phase AC power sources.

FIG. 1 shows a typical electric overhead travelling crane 2 including a control panel 4, magnet control 6, manual magnetic disconnect 8, dynamic braking resistor rack 10, operator controllers 12, brakes 14, and power limit switch 16. The crane 2 further includes a hoist 18 for a bottom block 20 having a hook 21, a bridge 22, a trolley 24, a trolley motor 26, a bridge motor (direct wire) 28, a hoist motor 30, an end truck 32 and a runway 34. The arrows 36, 38 and 40 indicate the bridge, trolley, and load or hoist directions, respectively, of the crane 2.

FIG. 2 shows four quadrants (I, II, III, IV) of operation for a DC motor (M) 42 including a first quadrant 44 for positive speed (S) and positive torque (T) (e.g., power hoisting under relatively light or heavy load), a second quadrant 46 for positive speed and negative torque (e.g., braking hoisting motion under relatively light or heavy load), a third quadrant 48 for negative speed and negative torque (e.g., power lowering under relatively light load), and a fourth quadrant 50 for negative speed and positive torque (e.g., braking lowering motion under relatively heavy load).

There is room for improvement in motor controllers.

SUMMARY OF THE INVENTION

These and other needs are met by the present invention in which a universal microprocessor-based DC/DC controller provides a wide range of control applications for DC shunt, compound or series wound DC motors powered by a DC/DC converter.

As one aspect of the invention, a reversible direct current (DC) motor drive is for a DC motor having a speed and a torque, including first and second terminals for a field winding and third and fourth terminals for an armature winding, and operable in at least one of four quadrants including positive speed and positive torque, positive speed and negative torque, negative speed and negative torque, and negative speed and positive torque. The DC motor drive comprises: at least two input terminals adapted to receive a DC voltage, the input terminals including first and second input terminals; first and second switches electrically connected in series between the first and second input terminals; first and second transistors electrically connected in series between the first and second input terminals; first and second diodes electrically connected in parallel with the first and second transistors, respectively, the first and second transistors having a first polarity, the first and second diodes having an opposite second polarity; a third diode; a third transistor electrically connected in series with the third diode, the third transistor having the first polarity, the third diode having the opposite second polarity; at least three output terminals, the output terminals including a first output terminal electrically interconnected with a first node between the first and second switches, a second output terminal electrically interconnected with a second node between the first and second transistors, and a third output terminal electrically interconnected with a third node between the third diode and the third transistor; means for determining a voltage between the first and second output terminals; means for determining a first current flowing between the second node and the second output terminal, and a second current flowing between the third node and the third output terminal; means for calculating the speed of the DC motor from the determined voltage, the determined first current and the determined second current; and means for controlling the first, second and third transistors and responding to the calculated speed of the DC motor to provide operation of the DC motor in the four quadrants and independent control of the first and second currents.

Preferably, the first and second input terminals have a capacitor electrically connected therebetween. The means for controlling includes a third switch and a fourth switch, with the third switch electrically connected in series with a resistor, the series combination of the third switch and the resistor being electrically interconnected between a third input terminal and the first input terminal, the fourth switch electrically interconnected between the first and third input terminals. The means for controlling further includes means for closing the third switch, means for sensing a voltage of the capacitor, and means for closing the fourth switch after the voltage of the capacitor is above a predetermined value.

The first and second terminals of the DC motor may be electrically interconnected in series with the third and fourth terminals of the DC motor. The first output terminal is adapted for electrical interconnection with the first terminal of the DC motor, the second output terminal is adapted for electrical interconnection with the second terminal of the DC motor, and the third output terminal is adapted for electrical interconnection with the fourth terminal of the DC motor.

The first and second output terminals may be adapted for electrical interconnection with the first and second terminals, respectively, of the DC motor, and the third and fourth output terminals may be adapted for electrical interconnection with the third and fourth terminals, respectively, of the DC motor.

A fourth output terminal may be electrically interconnected with the first input terminal.

As another aspect of the invention, a reversible direct current (DC) motor drive is for a DC motor having a speed, including first and second terminals for a field winding having a field voltage and a field current, and third and fourth terminals for an armature winding having an armature voltage and an armature current. The DC motor drive comprises: a DC/DC converter having a DC input and at least three output terminals, the output terminals including a first output terminal having a first pulsed DC voltage with a first DC voltage value, a second output terminal having a second pulsed DC voltage with a second DC voltage value, and a third output terminal having a third pulsed DC voltage with a third DC voltage value, the first and second output terminals adapted for electrical interconnection with the first and second terminals of the DC motor, the third output terminal adapted for electrical interconnection with the fourth terminal of the DC motor; means for determining the armature voltage of the armature winding of the DC motor; means for determining the field current of the field winding of the DC motor; means for determining the armature current of the armature winding of the DC motor; means for calculating the speed of the DC motor from the determined armature voltage, the determined field current and the determined armature current; means for providing a speed reference; and means for controlling the DC/DC converter responsive to the calculated speed of the DC motor and the speed reference in order to independently control the first, second and third DC voltage values.

Preferably, the means for controlling includes a nested loop structure including an outer control loop for the speed of the DC motor and two separately controllable inner control loops for the armature current and the field current of the DC motor.

As a further aspect of the invention, a reversible direct current (DC) motor drive is for a DC motor having a speed and a torque, including first and second terminals for a field winding and third and fourth terminals for an armature winding, and operable in at least one of four quadrants including positive speed and positive torque, positive speed and negative torque, negative speed and negative torque, and negative speed and positive torque. The DC motor drive comprises: at least two input terminals adapted to receive a DC voltage, the input terminals including first and second input terminals; first and second switches electrically connected in series between the first and second input terminals; first and second transistors electrically connected in series between the first and second input terminals; first and second diodes electrically connected in parallel with the first and second transistors, respectively, the first and second transistors having a first polarity, the first and second diodes having an opposite second polarity; a third diode; a third transistor electrically connected in series with the third diode, the third transistor having the first polarity, the third diode having the opposite second polarity; at least three output terminals, the output terminals including a first output terminal electrically interconnected with a first node between the first and second switches, a second output terminal electrically interconnected with a second node between the first and second transistors, and a third output terminal electrically interconnected with a third node between the third diode and the third transistor; means for determining a voltage between the first and second output terminals; means for determining a first current and a second current, the first current flowing between one of the first node and the first output terminal, the second node and the second output terminal, and the third node and the third output terminal, and the second current flowing between a different one of the first node and the first output terminal, the second node and the second output terminal, and the third node and the third output terminal; means for calculating the speed of the DC motor from the determined voltage, the determined first current and the determined second current; and means for controlling the first, second and third transistors and responding to the calculated speed of the DC motor to provide operation of the DC motor in the four quadrants and independent control of the first and second currents.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
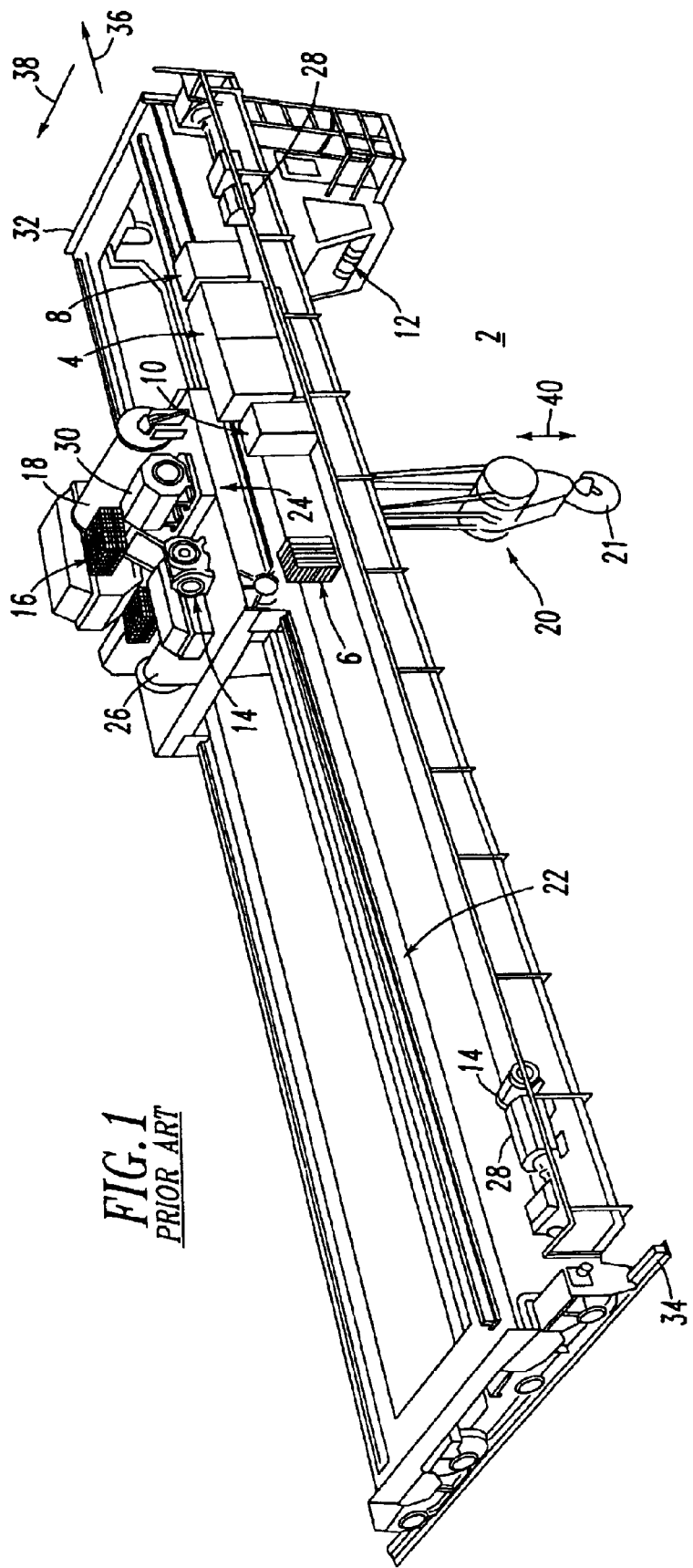
FIG. 1 is an isometric view of an electric overhead travelling crane.
Figure 2:
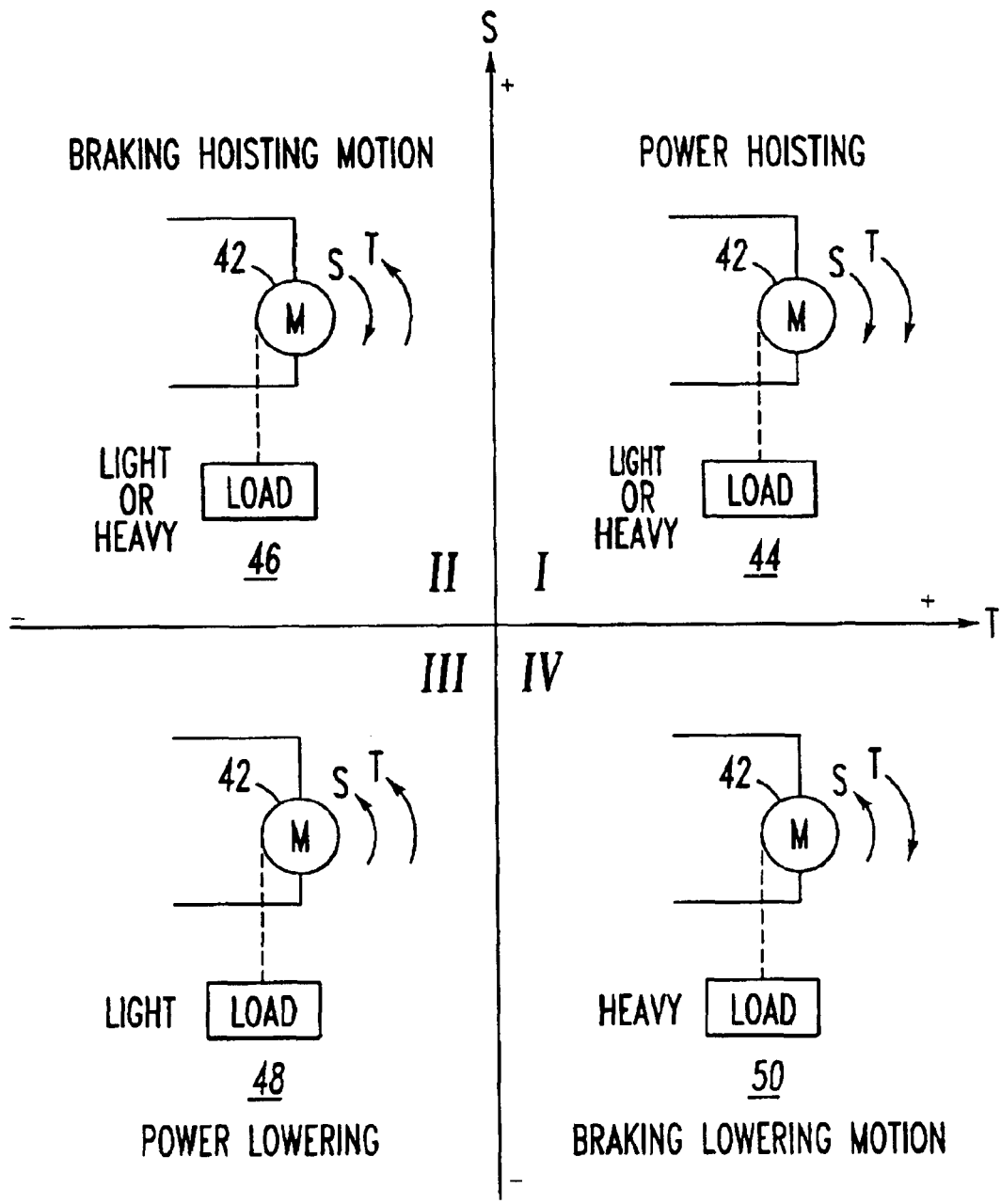
FIG. 2 is a plot showing four quadrants of operation for a DC motor having a speed and a torque.

The following are non-limiting definitions of various terms employed herein.

Counter electro motive force (CEMF) is the voltage across a motor's armature by virtue of its rotation in the motor's magnetic field flux.

A DC/DC converter is a device comprising a connection to a DC voltage, a plurality of power semiconductors, and an associated control mechanism for controlling current to a DC motor to provide speed and torque control.

A Receptive DC power supply is a DC power supply capable of absorbing regenerated electrical energy without an excessive increase in its output DC voltage. The ability to absorb regenerated electrical energy may be due the DC power supply's relatively large size and plural loads being connected to it. Alternatively, in the case of a relatively smaller DC power supply, such ability may be due to the incorporation of a switchable energy-absorbing load resistor.

A Four quadrant DC/DC converter is a DC/DC converter which is capable of controlling electrical energy flow from the DC voltage to the DC motor, or electrical energy flow from the DC motor to a receptive DC power supply during regenerative braking.

A Bipolar Junction Transistor (BJT) is an amplifying power semiconductor switching device capable of being switched ON and OFF by a relatively small current being applied to its base/emitter terminals.

An Insulated Gate Bipolar Transistor (IGBT) is a power semiconductor switching device having a superior switching performance compared to BJTs.

A Sensor-less DC motor is a DC motor having no speed-sensing devices.

A Silicon Controlled Rectifier (SCR) is a controllable semiconductor rectifier/switching device, which latches ON when its gate receives a relatively small electrical impulse, and which can only turn OFF when the main current through the device falls to zero for a relatively short period of time.

DC motors are used for unidirectional and reversible motion applications. The present invention is most advantageous for reversible applications, although it can also be employed for unidirectional applications.

Reversible motion applications are of two types. In the first type, the DC motor performs identical functions in either direction of motion, which typically entails that the direction of rotation and torque of the motor shaft are in the same direction for most of the operating time, with relatively short instances of torque in the opposite direction occurring during braking. That is, shaft rotation and torque direction are clockwise for most of the time with torque being counter-clockwise during braking for conveyance motion in one direction, and shaft rotation and torque are counter-clockwise for most of the time during motion of the conveyance in the opposite direction with torque occurring in the clockwise direction during braking. Examples of such applications include horizontal crane motions (e.g., bridge and trolley drives; railed electric vehicles, such as, for example, transfer cars, shuttle cars, electric locomotives and portal buses used in underground mining).

In the second type, the DC motor produces different combinations of torque and angular velocity depending on the direction of rotation. For example, in crane hoisting applications, rotation and torque would generally be in the same direction during raise operations, but in opposite directions during lowering operations.

The exemplary DC/DC controller and DC/DC converter disclosed herein may be employed with shunt, compound and series wound DC motors in one or both of these two types of applications. Although the exemplary embodiments are related to crane motion applications, the invention is applicable to other types of applications including, but not limited to, electric vehicles.

Figure 3:
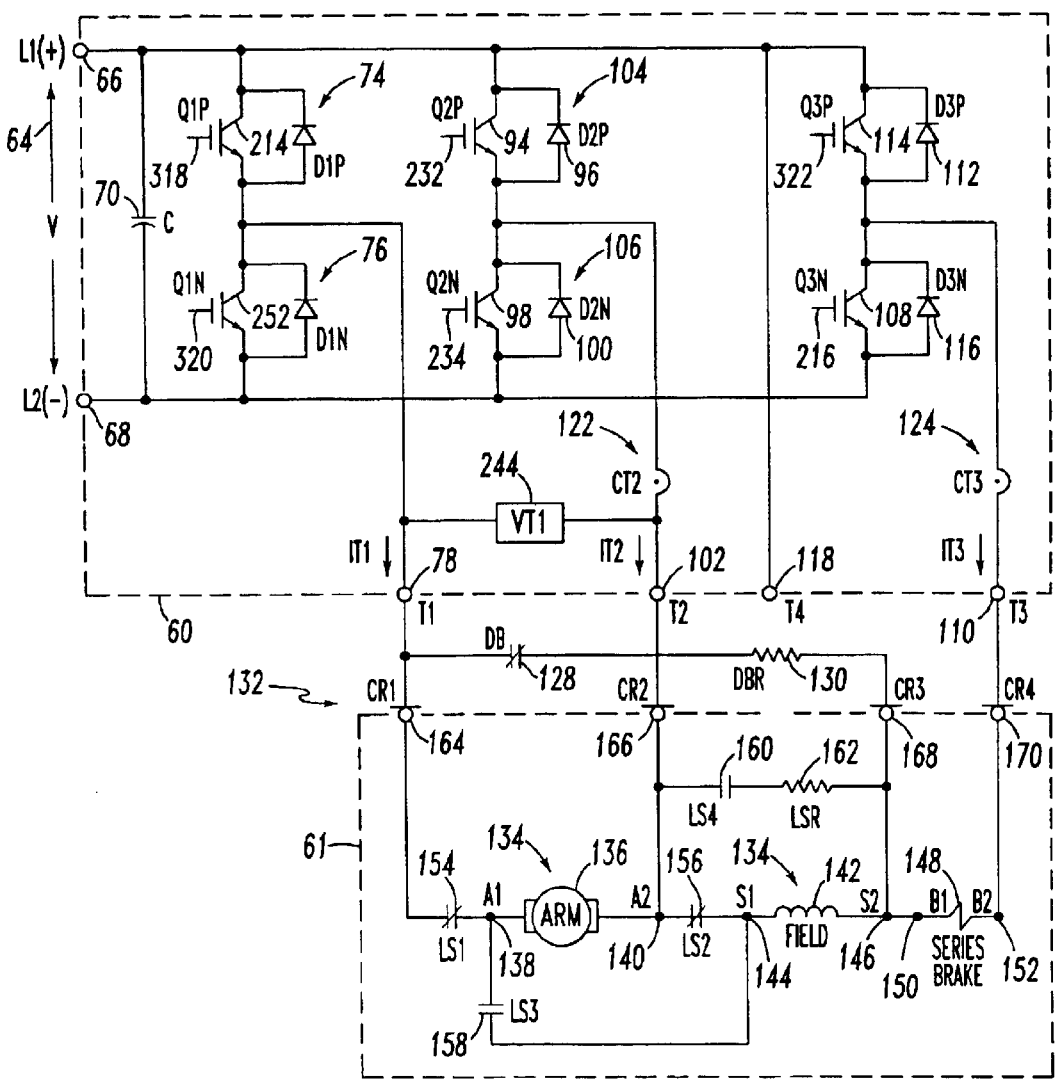
FIG. 3 is a block diagram in schematic form of a DC/DC converter of a crane hoist motion controller for a DC motor in accordance with the present invention.
Figure 4:
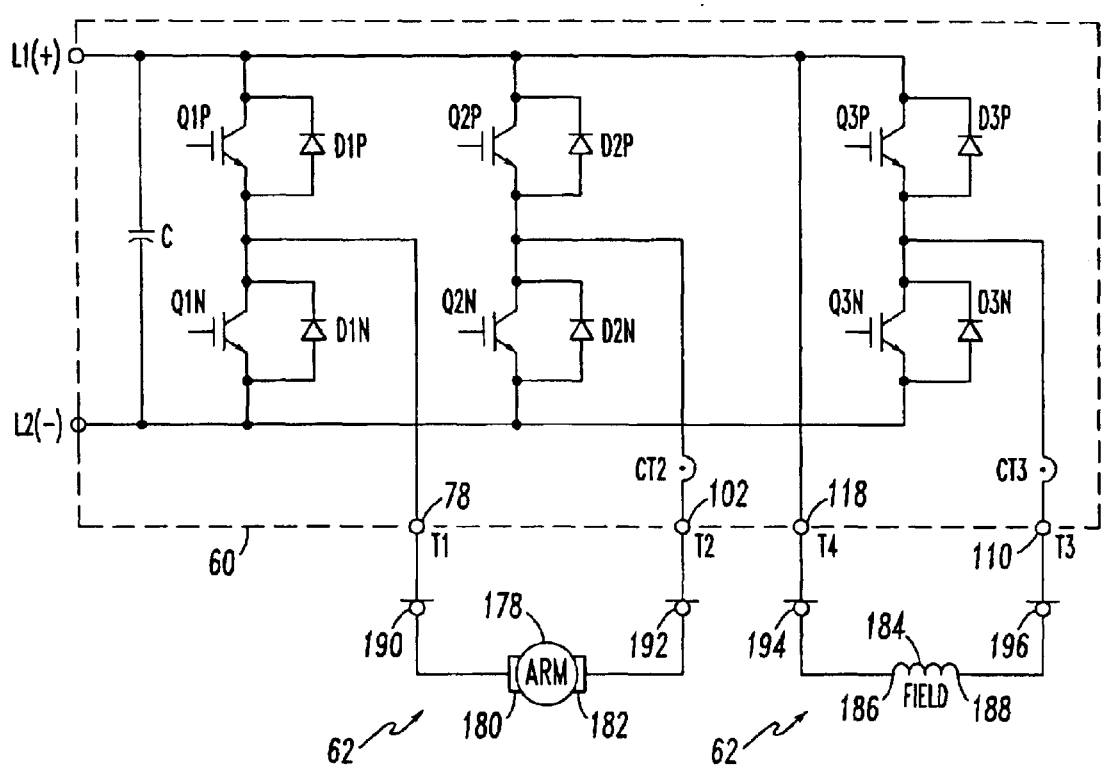
FIG. 4 is a block diagram in schematic form of the DC/DC converter of FIG. 3 and a DC motor connected for crane travel (bridge and trolley) motions in accordance with another embodiment of the invention.

Referring to FIGS. 3 and 4, FIG. 3 shows a DC/DC converter 60 configured for the vertical hoist motion of a crane movable hoist platform 61. FIG. 4 shows the same DC/DC converter 60 configured for the horizontal travel motion of a series-field, shunt-field or compound-field wound DC motor 62 for a crane (not shown). In both examples, the electrical circuit of the DC/DC converter 60 is identical.

As shown in FIG. 3, the DC supply voltage V 64 to the DC/DC converter 60 enters at terminals L1(+) 66 and L2(-) 68. The voltage 64 is typically 250 VDC, although a wide range of DC supply voltages may be employed (e.g., without limitation, less than 250 VDC, up to about 700 VDC). The DC supply voltage 64 may be derived from a suitable DC source (e.g., an AC/DC rectifier, a DC generator, a battery, a fuel cell). The supply system (e.g., a receptive DC power supply) absorbs current from the DC/DC converter 60, for example, during periods when energy is recovered from lowering loads or from decelerating the inertia of moving parts.

A capacitor C 70 is electrically connected across the incoming terminals L1(+) 66 and L2(-) 68 to provide a low impedance path for ripple current that arises through the use of variable duty cycle control. A fail-safe soft-charge circuit 72 (as discussed below in connection with FIG. 14) is preferably employed to prevent potentially damaging current from occurring during initial connection of the DC/DC converter 60 to the DC supply voltage 64.

Figure 12:
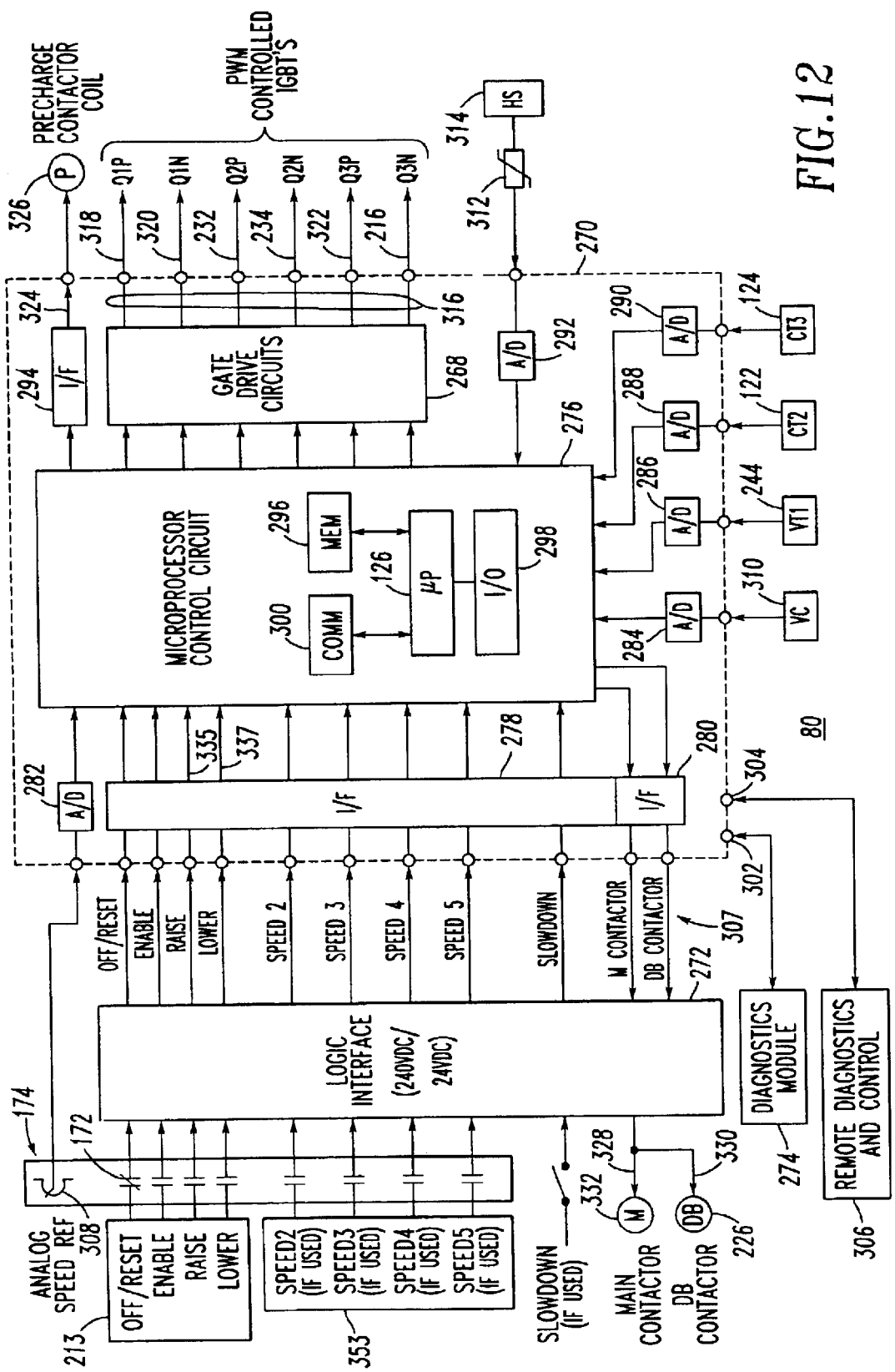
FIG. 12 is a block diagram in schematic form showing external contactors and current and voltage transducers connected to a microprocessor-based DC/DC controller for the DC/DC converter of FIG. 3.

IGBTs Q1P 74 and Q1N 76 permit the first output terminal T1 78 to be connected to either the positive or negative side of the DC supply voltage 64 at the appropriate time under electronic control of the DC/DC controller 80 of FIG. 12. In most instances, these two IGBTs 74,76 are switched by variable duty cycle control. Although IGBTs 74,76 are shown, a wide range of switching devices may be employed. For example, as shown with the DC/DC converter 60' of FIG. 7, which converter is similar to the DC/DC converter 60 of FIG. 3, contactor R 82 and contactor L 84 permit output terminal T1 86 to be electrically connected to either the positive or the negative side of the DC supply voltage 88 at the appropriate time under electronic control (not shown). In that electronic control, suitable precautions are undertaken by mechanical, electrical or electronic interlocking (not shown) to ensure that the contactors 82,84 are never closed simultaneously, in order to prevent a short-circuit of the DC supply voltage 88. Alternatively, suitable precautions are undertaken to ensure that the IGBTs 74,76 (FIG. 3) and SCRs 82',84' (FIG. 8) are never on at the same time.

Figure 8:
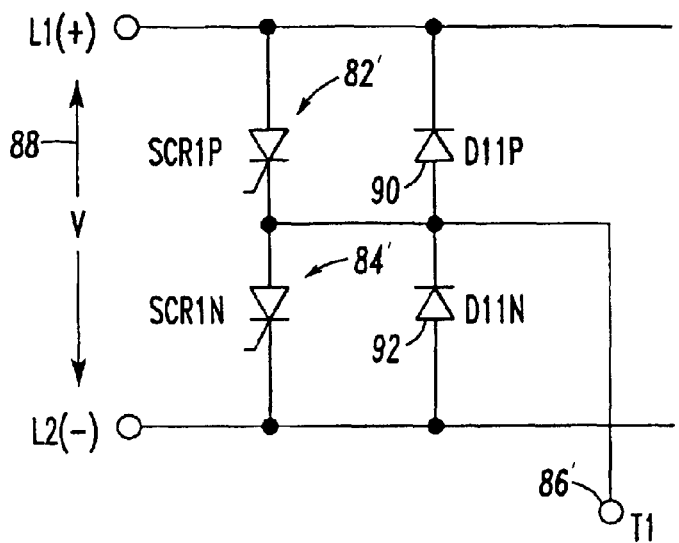
FIG. 8 is a block diagram in schematic form similar to the DC/DC converter and DC motor of FIG. 3, but including SCRs and anti-parallel diodes in accordance with an alternative embodiment of the invention.

As another example, the switching devices R 82 and L 84 may be implemented with solid state switching devices, such as the exemplary SCRs SCR1P 82' and SCR1N 84', respectively, of FIG. 8. Typically, the SCRs 82',84' are associated with anti-parallel diodes 90,92, respectively. In both of these alternative arrangements, suitable protective circuits (not shown) are provided to prevent short circuits across the DC supply voltage 88.

As discussed below in connection with FIG. 6, the IGBTs 74,76 of FIG. 3 may be controlled by variable duty cycle control, in order to obtain improved performance compared to that possible with the embodiments of FIGS. 7 and 8.

Continuing to refer to FIG. 3, power semiconductors, including transistor Q2P 94, diode D2P 96, transistor Q2N 98 and diode D2N 100, are employed to control the voltage at second output terminal T2 102 by switching it to either the positive or negative side of the DC supply voltage 64. In a preferred embodiment, the transistor Q2P 94 and anti-parallel diode D2P 96 are part of an IGBT 104, and the transistor Q2N 98 and anti-parallel diode D2N 100 are part of an IGBT 106. Although exemplary IGBTs 104,106 are shown, the DC/DC converter 60 may also be implemented using any other suitable power semiconductors having sufficient speed and suitable control. As discussed below in connection with FIGS. 6, 10 and 11, the voltage at output terminal T2 102 is controlled by Pulse Width Modulation (PWM).

IGBT transistor Q3N 108 controls the voltage at a third output terminal T3 110. A diode D3P 112 provides a freewheel path for current entering terminal T3 110 when transistor Q3N 108 is not conducting. The invention does not require the IGBT transistor Q3P 114 and/or the anti-parallel diode D3N 116. However, in the exemplary embodiment, two IGBT transistors 108,114 and two anti-parallel diodes 116,112 are integrated in a common semiconductor housing (not shown), for ease of mechanical assembly, usually for relatively smaller horsepower power ratings. Alternatively, other embodiments (not shown) for relatively larger horsepower drives may employ separate components for diode D3P 112 and transistor Q3N 108, thereby avoiding incorporation of unused semiconductor power elements (e.g., transistor Q3P 114; diode D3N 116).

The fourth output terminal T4 118 is directly electrically connected to the positive side of the DC supply voltage 64 at terminal L1(+) 66. This output terminal 118 is not employed in the application shown in FIG. 3, but is employed for horizontal motions or for the field connection of DC shunt or compound motors (as discussed below in connection with FIG. 4).

Measurement of currents flowing from second and third output terminals T2 102 and T3 110 is obtained through current signals from current transducers CT2 122 and CT3 124, respectively. The current flowing from first output terminal T1 78 is determined by the microprocessor 126 of FIG. 12 as shown by Equation 1:

$$IT1 = -(IT2 + IT3) \tag{Eq. 1}$$

wherein IT1, IT2 and IT3 are currents flowing from the output terminals T1 78, T2 102 and T3 110, respectively. It will be appreciated that equivalent embodiments may determine such currents by sensing current flow at any two of the three terminals 78,102,110 (e.g., terminals 78,102; terminals 78,110).

As discussed below in connection with FIG. 13, the current IT1 (armature current $I_A$) and current IT3 (field current $I_F$) are current feedback signals employed by the microprocessor 126 for the purpose of current regulation, sensing over-current and overload conditions, and for a sensor-less motor speed calculation function.

Figure 17:
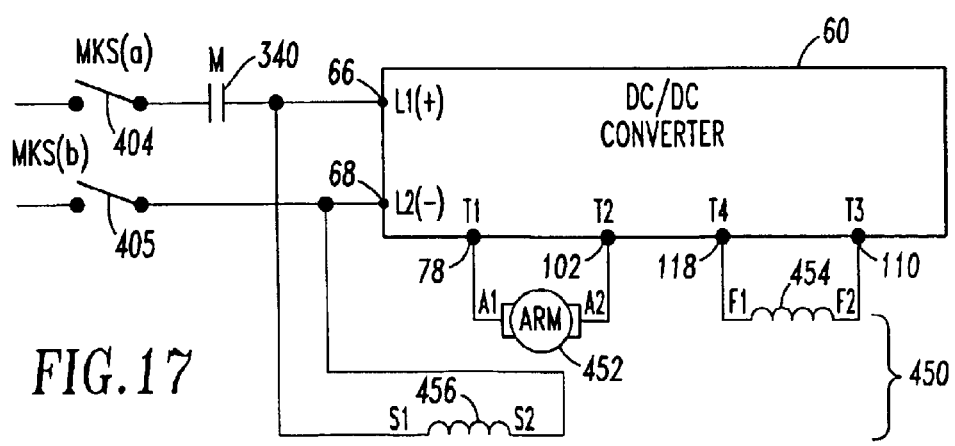
FIG. 17 is a simplified block diagram in schematic form of the DC/DC converter of FIG. 3 and a DC compound motor in accordance with an alternative embodiment of the invention.

Referring again to FIG. 3, the crane movable hoist platform 61, and four shoes 132 are installed on appropriate locations on the crane hoist platform, bridge or trolley (not shown). The normally closed contact DB 128 is part of a control panel (e.g., 4 of FIG. 1), and the dynamic braking resistor (DBR) 130 is part of a DBR rack (e.g., 10 of FIG. 1). In many cases where the DC/DC converter 60 and the DC/DC controller 80 of FIG. 12 are to be installed, these components are already present. As part of the crane movable hoist platform 61, a typical hoist motor is a series-field DC motor 134 comprising an armature winding (ARM) 136 electrically connected between points A1 138 and A2 140 and one or more field windings (FIELD) 142 (only one field winding is shown in FIG. 3; two field windings are shown in FIG. 17) electrically connected between points S1 144 and S2 146. Alternatively, a DC shunt motor may be employed to control the hoist motion. The motor 134 produces torque in the hoisting direction when current flows in the motor from point A1 138 to point A2 140 and from point S1 144 to point S2 146.

The crane movable hoist platform 61 also includes a series brake 148 electrically connected between the points B1 150 and B2 152. The exemplary brake 148 is a spring-set friction brake, which is released by a current flow that exceeds about 40% of the rated current of the motor 134. After the brake 148 is released, it is set when the current falls to less than about 10% of rated motor current. These levels are determined by suitable industry standards.

The platform 61 further includes contacts LS1 154, LS2 156, LS3 158 and LS4 160 and resistor LSR 162, which components form a power limit switch circuit to disconnect power from the motor 134 and establish a braking circuit at an appropriate time of travel. This is an essential safety feature of many crane hoist installations. As shown in FIG. 1, the power limit switch (LS) 16 prevents travel of the hook 21 beyond a safe limit. During normal operation, the contacts 154,156 are normally closed, and the contacts 158,160 are normally open. When the hook 21 reaches a point close to its upper limit of travel, it engages a hanging weight and a counter-weighted actuating lever (not shown) of the limit switch 16. Engagement of the actuating lever changes the state of all four contacts 154,156,158,160, while return of the hook 21 in the lowering direction resets such contacts to the normal states shown in FIG. 3.

The exemplary embodiment of FIG. 3 does not employ or require any early disable signals to gate the IGBT transistors 94,98,108 off before operating nor does it employ or require any additional bypass devices or back-out circuitry.

Current is carried to the bridge-mounted hoist motor 134 through conductor rails and collector shoes CR1 164, CR2 166, CR3 168 and CR4 170, with shoes CR1 164, CR2 166, and CR4 170 being electrically connected to output terminals T1 78, T2 102 and T3 110, respectively. In some installations, flexible (e.g., hardwired; festooned) cables (not shown) may be employed to make this electrical connection.

The normally closed contact DB 128 electrically connects the dynamic brake resistor DBR 130 between shoes CR1 164 and CR3 168 whenever the operator's control 172 (e.g., OFF/Hoist/Lower/Forward/Reverse of the operator's control panel 174 of FIG. 12; operator controllers 12 of FIG. 1) is in the OFF position, if power is removed from the DC/DC converter circuit 60, or if any emergency or unsafe condition is detected (e.g., the microprocessor 126 of FIG. 12 detects an over-speed or over-current condition; in response to a limit switch (not shown); in response to an operator emergency button (not shown) on the operator's control panel 174 (FIG. 12) or on the cab (not shown); if the DC supply voltage 64 is lost). In the exemplary embodiment, the DB contactor 128 and the DBR resistor 130 are mounted separate from the DC/DC converter 60 and the crane movable hoist platform 61.

As shown in FIG. 4, the typical motor 62 is a series-field or shunt-field wound DC motor comprising an armature 178 connected between points 180,182, and a field winding 184 connected between points 186 and 188. The motor 62 produces torque in the direction for left or forward travel when current flows from point 180 to point 182 in the armature 178, and from point 186 to point 188 in the field 184. The motor 62 produces an opposite torque when the current in the armature 178 flows from point 182 to point 180 for right or reverse travel, with current in the field 184 remaining in the same direction for both directions of travel.

Current is carried to the bridge motor 62 between output terminals T1 78, T2 102, T3 118 and T4 110 and conductor rails and collector shoes CR1 190, CR2 192, CR3 194 and CR4 196, respectively. In some installations, flexible cables (e.g., hardwired; festooned) may be employed to make this connection. In most cases, the DC/DC converter 60 is mounted on the crane structure (e.g., bridge 22 of FIG. 1), thereby eliminating the need for conductor rails for the bridge motor 62.

Figure 5:
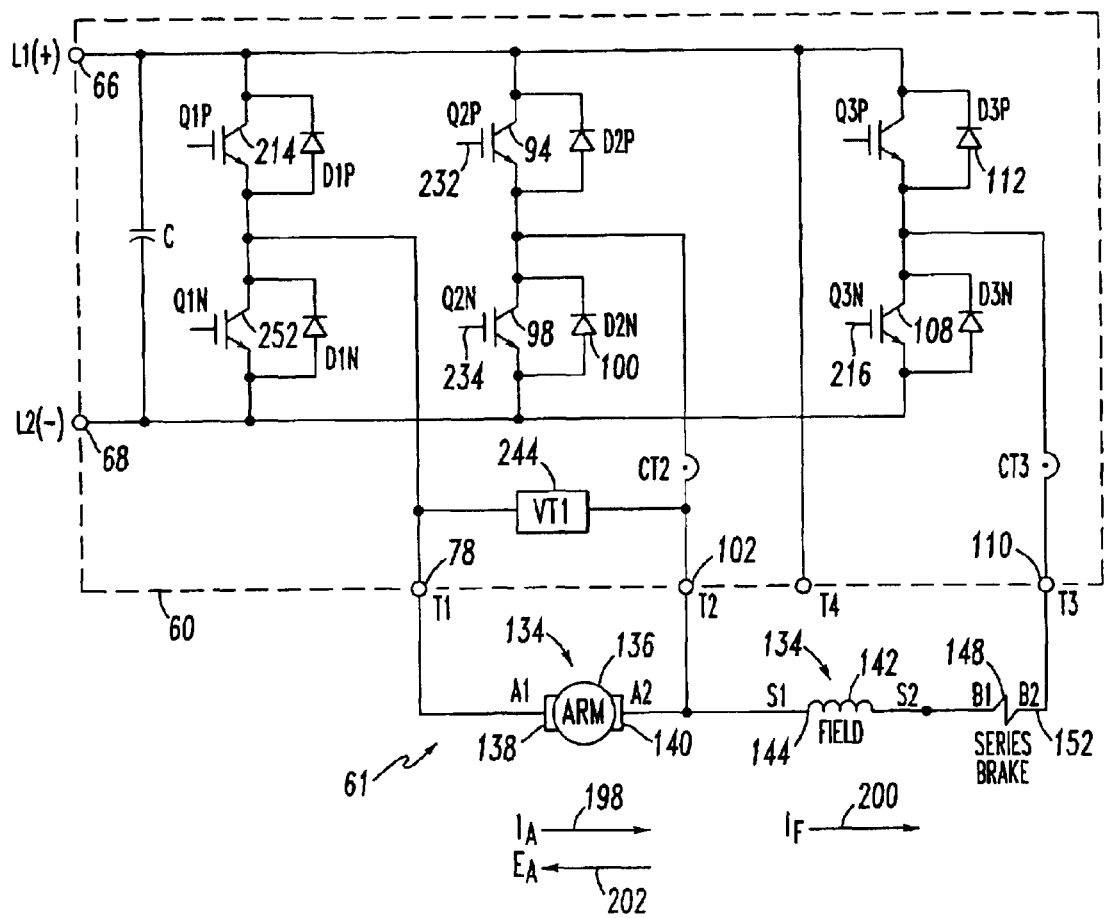
FIG. 5 is a simplified block diagram in schematic form of the DC/DC converter and DC motor of FIG. 3.

In order to most simply describe the operating modes of the exemplary DC/DC converter 60, FIG. 5 shows the circuit of the crane movable hoist platform 61 of FIG. 3 in a simplified form in which the power limit switch and dynamic brake elements are omitted. These components have no function during normal hoisting and lowering operations. The directions for the positive values of armature current $I_A$ 198 and field current $I_F$ 200 are shown. Armature Counter Electro Motive Force (CEMF) or voltage $E_A$ 202 (e.g., generated by the DC motor 134 as a result of armature rotation in the magnetic flux of the field) is also shown. This voltage 202 is positive when the motor is rotating in the hoisting direction.

Figure 6:
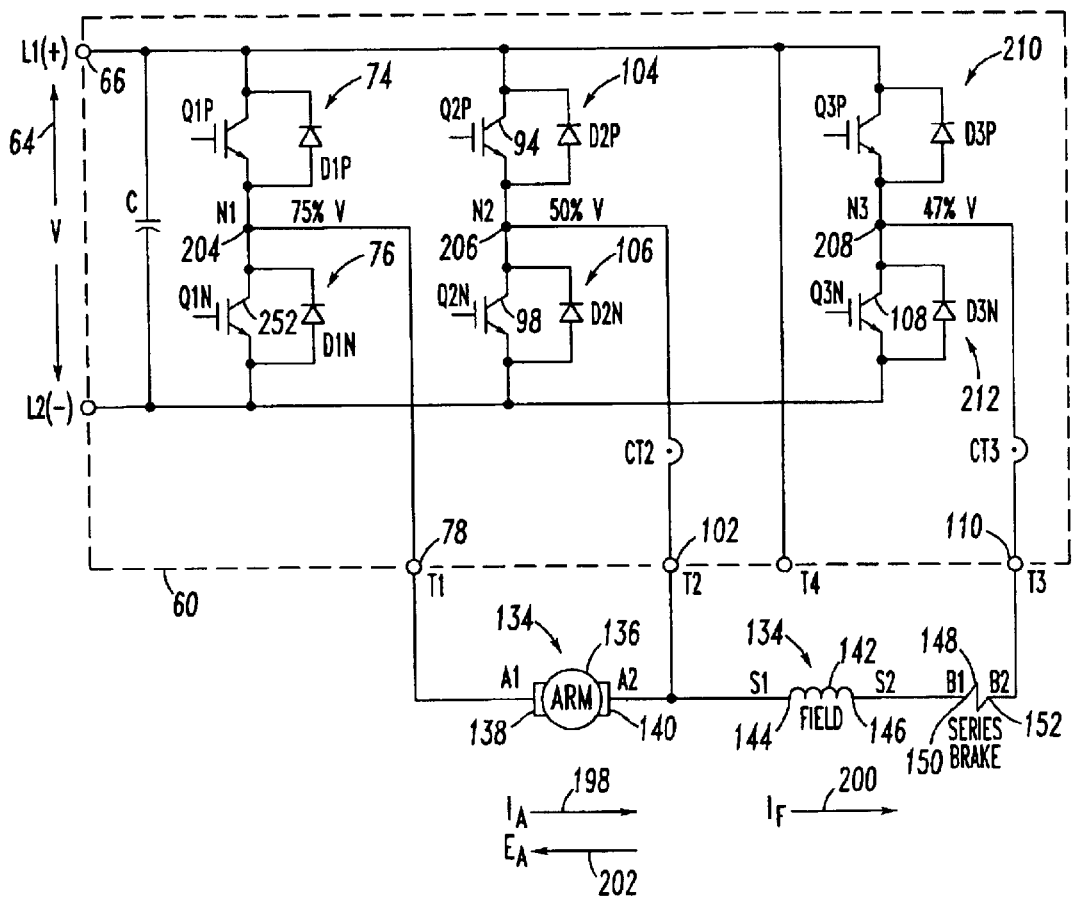
FIG. 6 is a simplified block diagram in schematic form of the DC/DC converter and DC motor of FIG. 3 including node voltages of the DC/DC converter.

Referring to FIG. 6, node N1 204, node N2 206 and node N3 208 are at the junctions of IGBT pairs Q1P/Q1N 74,76, Q2P/Q2N 104,106 and Q3P/Q3N 210,212, respectively, of the DC/DC converter 60. When a hoisting operation is about to commence, with the load (not shown) resting on the floor (not shown), these three nodes 204,206,208 are modulated by the DC/DC controller 80 of FIG. 12 at 50% in order that they are all at the same average DC voltage level, namely 50% of the DC supply voltage V 64. Consequently, there is no current in either the armature 136 or the field 142 of the series wound DC hoist motor 134.

To initiate hoisting, the operator moves a master switch 213 of the operator's control panel 174 of FIG. 12 away from the "OFF" position in the "RAISE" direction. In response, the DC/DC controller 80 modulates the DC/DC converter 60 to initiate a current flow in the direction from node N1 204, to terminal T1 78, to point A1 138, to the armature 136, and to point A2 140 by increasing the voltage at node N1 204 above 50% V. With node N2 206 remaining at 50% V and node N3 208 at less than 50% V, current will then flow in two paths: (1) into terminal T2 102 to node N2 206; and (2) into point S1 144, to field winding 142, to point S2 146, to point B1 150, to series brake 148, to point B2 152, and into terminal T3 110 to node N3 208. When the current through the field winding 142 and series brake 148 reaches 40% of nominal motor current, the brake 148 is released and the load (not shown) is raised if the current through the armature 136 and field 142 is sufficiently high.

The operator then moves a master switch 353 of the operator's control panel 174 of FIG. 12 to a desired speed reference position. In response, the DC/DC controller 80 modulates the DC/DC converter 60 to cause the DC voltages at all three nodes 204,206,208 to vary in order to maintain the appropriate armature and field currents 198,200 corresponding to "series motor" mode operation during which such armature and field currents are equal or by alternate setup to a customized speed-torque profile.

Typical operating conditions for an intermediate hoist speed setting are shown in FIG. 6, wherein the voltage across the armature 136 is 25% of the input DC voltage V 64 (i.e., 75% V–50% V in this example), and the voltage across the field 142 and series brake 148 is 3% of the input DC voltage V 64 (i.e., 50% V–47% V in this example).

At maximum hoist speed and load, typical node voltages are 100% V, 5% V, and 0% V at nodes N1 204, N2 206, and N3 208, respectively, corresponding to 95% input voltage across the armature 136 and 5% input voltage across the series brake 148 and field winding 142, with the armature and field currents 198,200 being equal. It should be noted, however, that this need not be the case in all circumstances since independent field control is possible throughout the entire hoist process.

Figure 9:
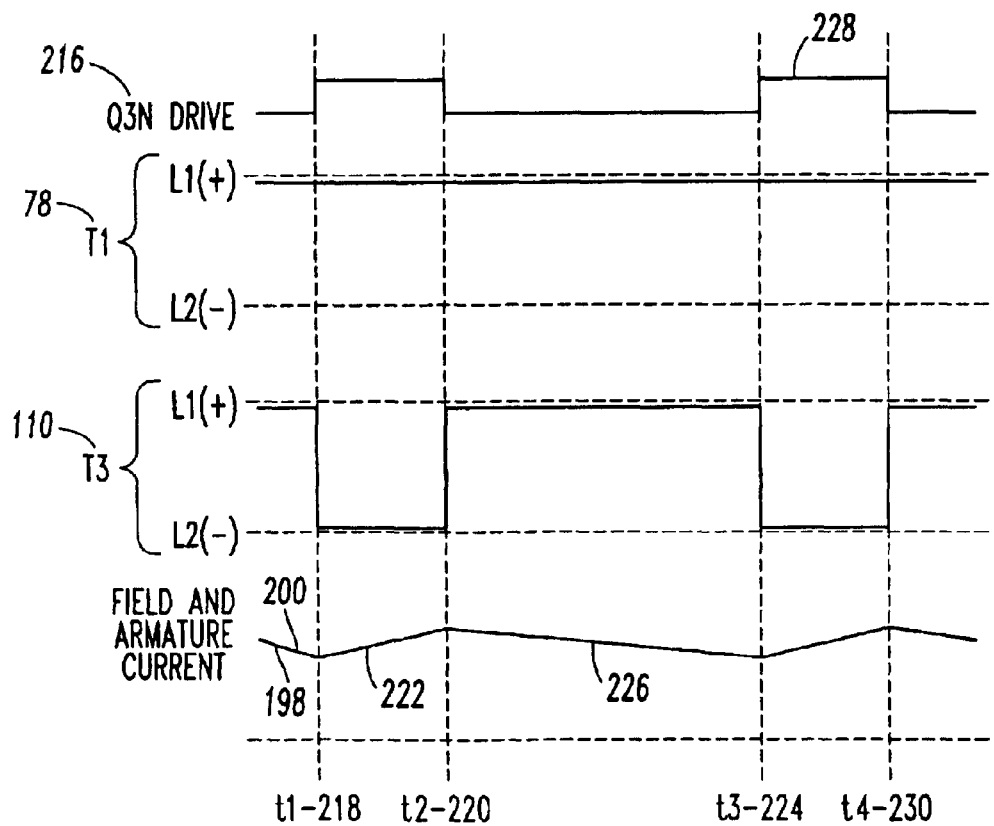
FIG. 9 is a timing diagram for the DC/DC converters of FIGS. 3 and 5 during hoisting (e.g., raising and/or lowering) with a series-connected armature and field.

FIG. 9 shows a method of control employing a single IGBT, Q3N 108, to control the identical field and armature currents 198,200 in the series connected armature winding 136 and field winding 142 of FIGS. 3 and 5. When the operator requests upward motion, IGBT Q1 P 214 is ON (alternatively, contactor R 82 of FIG. 7 is closed). IGBT devices Q2P 94 and Q2N 98 both remain OFF in this mode. IGBT device Q3N 108 is modulated with a suitable duty cycle on Q3N DRIVE signal 216 of FIGS. 9 and 12, which duty cycle is appropriate for the effort required by the operator and the counter EMF 202 of the armature 136.

Starting at time t1 218, Q3N 108 is turned ON. Between time t1 218 and time t2 220, current flows (from left to right in FIGS. 3 and 5) in the path from terminal L1(+) 66, through transistor Q1P 214, to terminal T1 78, to armature 136, to field winding 142, to series brake 148, to terminal T3 110, to and through transistor Q3N 108, and to terminal L2(–) 68. The DC supply voltage V 64 is substantially from point A1 138 to point B2 152 and causes the identical armature and field currents 198,200 to increase at 222 between times t1 218 and t2 220. At time t2 220, Q3N 108 is turned OFF. Between times t2 220 and t3 224, the identical armature and field currents 198,200 flow in the path from terminal T3 110 to and through diode D3P 112, to and through Q1P 124, to terminal T1 78, to and through armature 136, field 142, brake 148 and terminal T3 110. No voltage is applied across the motor 134 during this latter interval and, therefore, the current decreases as shown at 226. At time t3 224, the modulation cycle is repeated with a subsequent drive pulse 228 between times t3 224 and t4 230.

In this mode of control, the armature and field currents 198,200 are equal. For a fixed duty cycle, the average voltage applied to the motor 134 is constant. This produces hyperbolic torque/speed characteristics typical of a series-field motor operating from a constant supply voltage. These characteristics exhibit a large amount of torque at low speeds suitable for initial acceleration of heavy loads while permitting rapid movements of light loads. This feature can, however, be a disadvantage in that excessive speeds can be attained if the operator fails to exercise due care.

Figure 7:
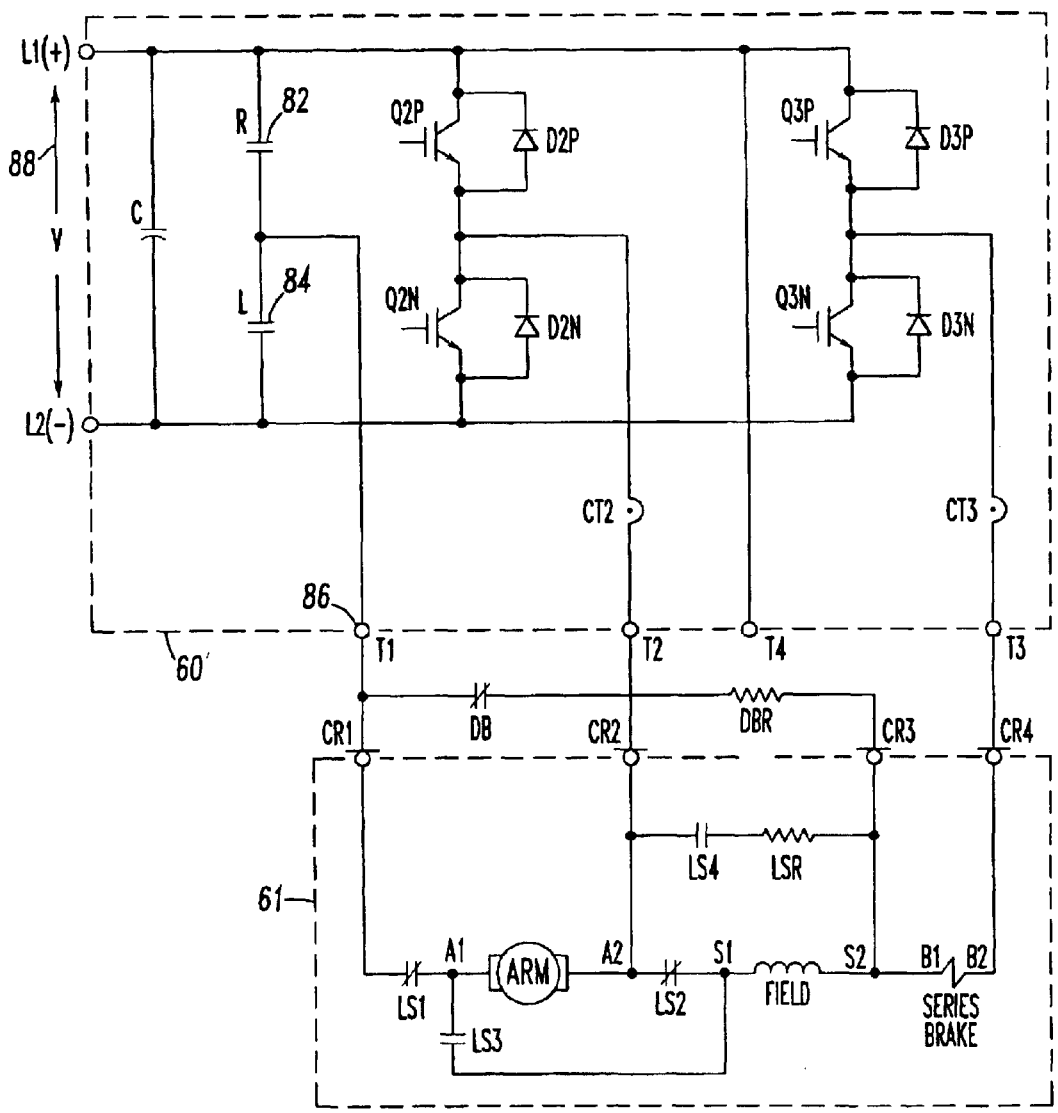
FIG. 7 is a block diagram in schematic form similar to the DC/DC converter and DC motor of FIG. 3, but including direction-changing contactors in accordance with an alternative embodiment of the invention.
Figure 10:
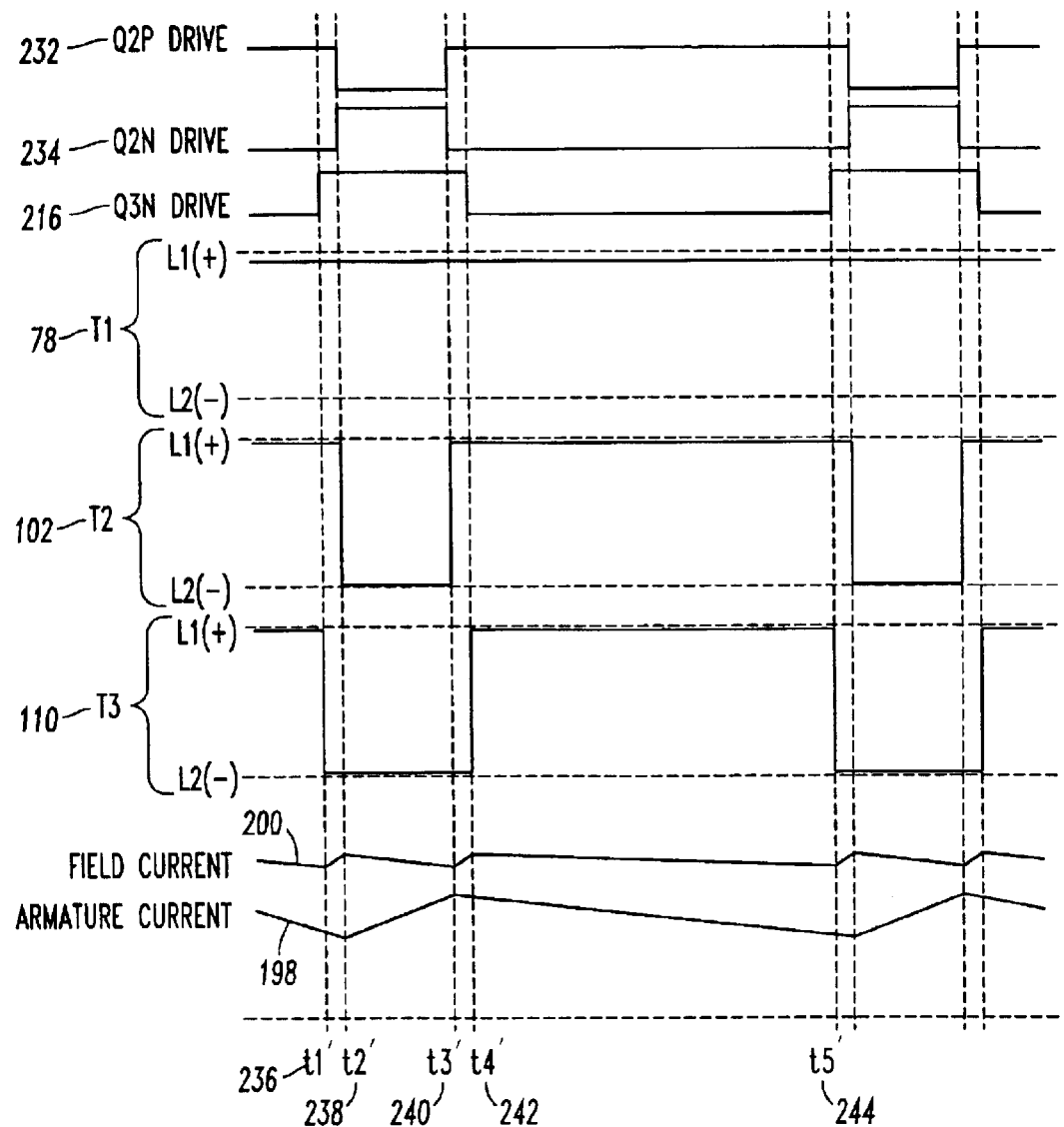
FIG. 10 is a timing diagram showing operation of the DC/DC converter of FIG. 3 during hoisting with independent field control.

FIG. 10 shows an alternative mode of operation for DC/DC converter 60 of FIGS. 3 and 5 (or the embodiments of FIG. 7 or 8). This mode allows speed under light load to be limited. In this mode, the field current $I_F$ 200 is controlled independently and may be maintained at a higher value or a lower value than the armature current $I_A$ 198 when the need arises.

When the operator requests upward motion, IGBT Q1P 214 is ON (alternatively, contactor R 82 of FIG. 7 is closed). IGBT devices Q2P 94 and Q2N 98 are driven by Q2P DRIVE signal 232 and Q2N DRIVE signal 234, respectively, of FIG. 12, as discussed below. IGBT device Q3N 108 is modulated with a suitable duty cycle on Q3N DRIVE signal 216 of FIG. 12. Node N1 204 (FIG. 6) is set to 100% V during this operating mode, thereby, in effect, connecting output terminal T1 78 to the positive DC supply voltage V 64. IGBTs Q2P 94 and Q2N 98 are electronically interlocked through the microprocessor 216 of FIG. 12 in order that when Q2P 94 is ON Q2N 98 is OFF and vice versa. A small delay preceding the turn-on of each device prevents cross conduction through both devices. This delay has negligible effect on the operation of the DC/DC controller 80 and is not shown by the waveforms of FIG. 10.

Preceding time t1' 236, Q2P 94 is ON, Q2N 98 is OFF and Q3N 108 is OFF. Terminal T2 102 is connected to the positive DC supply voltage V 64 by Q2P 94. Field current 200, if present, flows to the positive DC supply voltage V 64 via diode D3P 112. Since all output terminals 78,102,110 are connected to the positive DC supply voltage V 64, there is voltage neither across the field 142 nor the armature 136 and, therefore, both field current $I_F$ 200 and armature current $I_A$ 198 are falling.

At time t1' 236, Q3N 108 is turned ON, thereby connecting terminal T3 110 to the negative terminal L2(−) 68 (e.g., the return of the positive DC supply voltage V 64). During the interval between times t1' 236 to t2' 238, the positive DC supply voltage V 64 is applied terminals 102 and 110 between point S1 144 and point B2 152. The voltage across the armature 136 remains at zero. The field current 200 rises during this interval by an amount that can be regulated by controlling the length of the interval, while the armature current 198 continues to fall.

At time t2' 238, Q2P 94 is turned OFF and Q2N 98 is turned ON connecting terminal T2 102 to the negative terminal L2(−) 68. The positive DC supply voltage V 64 is now applied across only the armature 136, while the voltage across the field 142 becomes zero. During the interval between times t2' 238 to t3' 240, the armature current 198 rises by an amount that can be regulated by controlling the length of the interval, while the field current 200 falls during this period.

At time t3' 240, Q2P 94 is turned ON and Q2N 98 is turned OFF connecting terminal T2 102 to the positive DC supply voltage V 64. This configuration is identical to that which existed during times t1' 236 to t2' 238. This causes a similar increment in the field current 200 while the armature current 198 falls. The time duration between times t3' 240 and t4' 242 is typically the same as the duration between times t1' 236 and t2' 238, although this is not required.

At time t4' 242, Q3N 108 is turned OFF causing terminal T3 110 to return to the positive DC supply voltage V 64 by virtue of the conduction of the diode D3P 112. Between times t4' 242 and t5' 244 both the armature current 198 and the field current 200 fall. At time t5' 244, the modulation cycle is repeated as discussed above between times t1' 236 and t5' 244.

This sequence of states permits the mean voltage across the armature 136 to be controlled independently of the mean voltage across the field 142 with the restriction that the sum of the two voltages cannot exceed the positive DC supply voltage V 64. The voltage across the field 142 is not more than a few percent of the positive DC supply voltage V 64 since the resistances of the field winding 142 and series brake 148 are relatively low. The intervals between times t1' 236 and t2' 238 and between times t3' 240 and t4' 242 are, therefore, a small proportion of the total modulation cycle period. On the other hand, the voltage required by the armature 136 depends greatly upon the CEMF 202 arising from its rotation in the magnetic field. The interval between times t2' 238 and t3' 240 may, therefore, vary from zero to almost the whole of the modulation cycle period.

Using this mode of operation, it is possible to achieve hoisting speeds that are less dependent on the load being lifted. In this mode, the armature voltage $V_A$ is sensed by a voltage transducer VT1 244 of FIGS. 3 and 12, and maintained at a desired value by the action of the speed loop proportional plus integral (P+I) controller 246 of FIG. 13 in which an armature voltage regulator (not shown) supplies a current reference ($I_A$ REF) 248 to a fast-acting current regulator 250 that adjusts the interval between times t2' 238 and t3' 240 on a cycle by cycle basis. Alternatively, the voltage transducer VT1 244 is not required and the armature voltage $V_A$ may be determined directly or indirectly, such as by calculation, e.g., the DC supply voltage V 64 may be multiplied by the PWM duty cycle of the corresponding transistor(s) (e.g., Q3N 108 for the application of FIG. 9) in order to obtain a signal proportional to armature voltage.

Continuing to refer to FIG. 10, the field current 200 may also be held constant if necessary. This is most advantageous for light loads where the difficulty of controlling the speed of a simple series-field motor is most pronounced. By maintaining a minimum level of field current 200, a natural speed limit is reached when the armature voltage $V_A$ approaches the positive DC supply voltage V 64. In other words, the motor 134 cannot over-speed since there always exists a finite and significant field flux even when armature current 198 is very low. When maximum hoisting effort is required, the field current 200 is increased in line with the armature current 198, but may still be independently controlled so as to modify the torque/speed characteristics of the motor 134 if desired.

During lowering, the motion of the armature 136 causes the CEMF 202 that makes point A2 140 positive with respect to point A1 138. This is the negative direction.

For powered lowering with a light load or empty hook (e.g., 21 of FIG. 1), it is necessary for current to flow from point A2 140 to point A1 138, against the CEMF 202. The amount of current required in this circumstance will be relatively small since the torque needed is merely that to overcome the friction losses in the hoist mechanism.

When lowering or holding a heavy load, it is necessary for current to flow from point A1 138 to point A2 140, in the same direction as the CEMF 202. This mode, in which the armature 136 becomes a source of power, is referred to as dynamic lowering.

The method by which the power semiconductors Q2P 94, Q2N 98, Q3N 108 of FIGS. 3 and 5 are controlled is identical in both cases and the reversal of the direction of the armature current $I_A$ 198 smoothly makes the transition between powered lowering and dynamic lowering.

Figure 11:
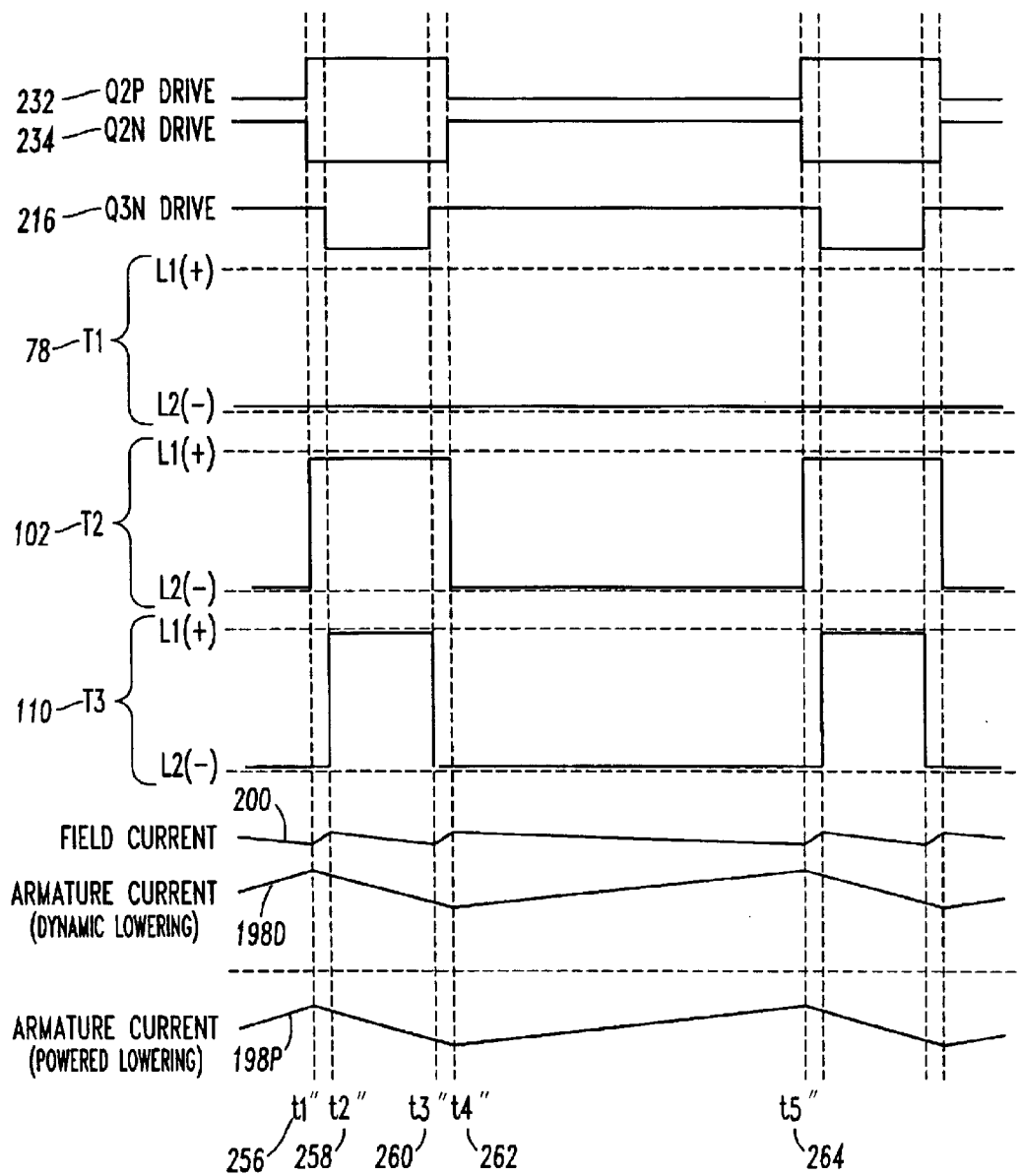
FIG. 11 is a timing diagram showing operation of the DC/DC converter of FIG. 3 during a hoist lowering operation.

Referring to FIGS. 5 and 11, when the operator requests movement in the lowering direction, IGBT Q1N 252 is ON (alternatively, contactor L 84 of FIG. 7 is closed). Terminal T1 78 (node N1 204 of FIG. 6) is set to 0% V, thereby effectively connecting point A1 138 to the negative terminal L2(−) 68. Preceding time t1" 256, Q2P 94 is OFF, and Q2N 98 and Q3N 108 are both ON, connecting both output terminals T2 102 and T3 110 to the negative terminal L2(−) 68. The voltage is zero across both the field 142 and the armature 136. The field current 200 now decays. If a CEMF 202 is present, then the action of the short-circuit across the armature 136 causes an increase of positive (i.e., dynamic lowering) armature current 198D in the positive direction. If the armature current is negative (i.e., powered lowering), then the absolute value of the armature current 198P will diminish during the time segment prior to time t1" 256.

At time t1" 256, Q2N 98 is turned OFF and Q2P 94 is turned ON, connecting output terminal T2 102 to the positive DC supply voltage V 64. During the interval between times t1" 256 and t2" 258, the positive DC supply voltage V 64 is now applied to both the field 142 and the armature 136. This causes an increment in the field current 200 by an amount proportional to the duration of this interval. The armature current 198D,198P is driven in the negative direction during this interval.

At time t2" 258, Q3N 108 is turned OFF. This disconnects output terminal T3 110 from the negative terminal L2(−) 68, but permits current from the field 142 to return to the positive DC supply voltage V 64 via diode D3P 112. Terminal T3 110, therefore, becomes connected to the positive DC supply voltage V 64 as long as field current 200 is maintained. During the interval between time t2" 258 and time t3" 260, the voltage across the field 142 is zero while the positive DC supply voltage V 64 is still applied to the armature 136. The field current 200 decays while the armature current 198D,198P continues to be driven in the negative direction. At time t3" 260, Q3N 108 is turned ON again and the field current 200 increases during the interval between times t3" 260 and t4" 262.

At time t4" 262, Q2P 94 is turned OFF and Q2N 98 is turned ON. During the interval between times t4" 262 and t5" 264, there is once again zero voltage across both the field 142 and the armature 136. The field current 200 is decaying while the CEMF 202 drives the armature current 198D,198P in the positive direction. At time t5" 264, the modulation cycle is repeated as discussed above between times t1" 256 and t5" 264.

By controlling the duration of the intervals between times t1" 256 and t2" 258, and between times t3" 260 and t4" 262, it is possible to regulate the field current 200 under closed-loop control to any desired value. Since the voltage required by the field winding 142 is small, these intervals occupy a small portion of the total period. The mean voltage across the armature 136 is determined by the time interval between time t1" 256 and time t4" 262. The armature current 198D, 198P can, therefore, be similarly regulated by adjusting this time interval.

During powered lowering, current flows from output terminal T2 102 and divides to become partly field current 200 into point S1 144 and partly armature current 198P into point A2 140. IGBT Q2P 94 and diode D2N 100 supply the sum of these two currents. The overall torque capability in this mode is, hence, severely limited by the rating of these two devices. In order to obtain 100% torque, it would be necessary for Q2P 94 and D2N 100 to supply 200% current into output terminal T2 102. Fortunately, the torque requirement for powered lowering is merely that necessary to overcome friction losses which are relatively small. It is, therefore, readily possible to provide sufficient torque for this mode without excessive current in the two devices 94,100.

During dynamic lowering, the current required from output terminal T2 102 is the difference between the field current 200 and the armature current 198D. Even for the maximum load of the crane, the difference between these two currents need not be very large.

Referring again to FIG. 3, the purpose of the dynamic brake resistor DBR 130 and the normally closed contact DB 128 is to provide a high integrity braking mechanism that is able to arrest the fall of a load under any conditions even if control or the DC supply voltage V 64 is lost. In order to keep the contact DB 128 open, the corresponding coil 266 of FIG. 12 is energized. Therefore, loss of control power causes the normally closed contact DB 128 to default to its closed state. An undervoltage relay (not shown) is employed to interrupt the current in the DB contactor coil 266 in order to initiate dynamic brake operation on loss of the DC supply voltage V 64. This coil 266 is further interlocked with emergency stop contacts (not shown) as well as the OFF position of the crane master switch 172 of FIG. 12.

During dynamic braking, the motor 134 functions as a self-excited generator as a result of the remnant flux in the motor field 142, and dissipates the energy from the falling load in resistor DBR 130. Motion of the load is necessary to keep the current flowing in the loop, but the rotational speed of the motor 134 is naturally limited to a safe level. Furthermore, the current in the DB loop does not circulate through the series brake 148. As a result, the brake 148 sets to arrest the motion of the load completely.

Continued upward motion of the hook (e.g., 21 of FIG. 1) eventually causes the limit switch LS (e.g., 16 of FIG. 1) to trip. This results in the opening of contacts LS1 154 and LS2 156, while contacts LS3 158 and LS4 160 are closed. Preferably, all contacts change state at about the same instant. Since LS1 154 is open, the DC/DC converter 60 cannot supply current to the armature 136 and, therefore, torque for hoisting immediately ceases. Contact LS3 158, point A1 138, armature 136, point A2 140, contact LS4 160, resistor LSR 162, point S2 146, field 142, point S1 144, and contact LS3 158 form a dynamic braking loop. The polarity of the field 142 is such that this loop is excited by upward motion. This causes rapid deceleration of the rising hook and limits the overrun of the hook past the trip point of the limit switch LS.

The DC/DC controller 80 of FIG. 12 detects that the limit switch LS has tripped by observing that the current IT1 from terminal T1 78 (e.g., as calculated from Equation 1, above, wherein the currents IT2 and IT3 are measured by the current transducers CT2 122 and CT3 124, respectively) has fallen to zero. This condition is inconsistent with normal hoist operation even with a light load. Therefore, it is a reliable method of detecting that the limit switch LS has tripped. The controller 80 then completely turns off all power semiconductors 214,252,94,98,114,108 through the corresponding gate drive circuits 268 in order to prevent current flow in the series brake 148 via the limit switch braking resistor LSR 162.

If an unloaded hook (e.g., 21 of FIG. 1) has been hoisted past the limit switch LS (e.g., 16 of FIG. 1), then it will be necessary to provide lowering torque in order to drive it downwards to the point where the limit switch LS resets. In other cases, there may be a substantial load on the hook that will cause downward motion as soon as the brake 148 is released. In either case, it is necessary to safely lower the hook to the point at which the limit switch resets and then to resume normal lowering.

This is achieved by setting terminal T1 78 (node N1 204 of FIG. 6) to 0% V (e.g., which is accomplished by turning IGBT Q1N 252 is ON; alternatively, contactor L 84 of FIG. 7 is closed), turning on Q3N 108 and, then, regulating the duty cycle of Q2P 94 and Q2N 98, in order to limit the current from output terminal T2 102. This mode of operation is similar to normal lowering. Current flows in the path from terminal L1(+) 66, through transistor Q2P 94, to terminal T2 102, to point A2 140, through armature 136 to point A1 138, through closed contact LS3 158 to point S1 144, through field 142 to point S2 146 and point B1 150, through series brake 148 to point B2 152, to terminal T3 110, to transistor Q3N 108, and to terminal L2(−) 68. Some current also flows through the parallel path formed by the series combination of closed contact LS4 160 and resistor LSR 162 to point S2 146. The polarity of the currents in the field 142 and armature 136 is such that torque is produced in the lowering direction. Lowering will not occur until there is sufficient current (e.g., about 40% of nominal motor current) to release the series brake 148.

Any load on the hook (e.g., 21 of FIG. 1) assists lowering. The configuration of the motor circuit is such that rapid downward acceleration of a heavily loaded hook cannot be opposed by torque in the hoisting direction. Free fall of the load is prevented by permitting the current to flow for relatively short periods of suitable duration to momentarily release the series brake 148, but also suitably brief in order to prevent the load from gathering speed.

Preferably, the contacts LS1 154, LS2 156, LS3 158, and LS4 160 are reset at the same instant when the hook (e.g., 21 of FIG. 1) is lowered past the reset position of the power limit switch LS (e.g., 16 of FIG. 1). At this point, the DC/DC converter 60 resumes normal lowering operation in order to provide downward torque for powered lowering or upward torque for dynamic lowering as appropriate.

FIG. 12 shows the DC/DC controller 80 for the DC/DC converter 60 of FIG. 3. Although an exemplary controller 80 is disclosed, a wide range of controllers for the DC/DC converter 60 and the timing diagrams of FIGS. 9–11 may be employed. The controller 80 includes a microprocessor control/gate driver module 270, a logic interface module 272 and a diagnostics module 274. The module 270 includes a microprocessor control circuit 276 having the microprocessor (μP) 126, an input interface (I/F) 278, an output I/F 280, six analog to digital (A/D) converters 282,284,286,288,290, 292, the gate drive circuits 268, and a coil driver I/F 294. The control circuit 276 includes suitable memory (MEM) 296 for the μP 126, and a suitable I/O interface 298 for the input I/F 278, output I/Fs 280,294, A/D converters 282,284, 286,288,290,292, and gate drive circuits 268. Preferably, a suitable communication interface (COMM) 300 is provided for a communication port 302 (e.g., RS-232) to the diagnostics module 274 and a communication port 304 (e.g., RS-485) to interface a remote diagnostics and control function 306.

The logic interface module 272 provides an interface between 240 VDC controls signals, such as the off/reset contact 172 of the operator's control panel 174, and 24 VDC signals at the module 270. The I/Fs 278,280 provide interfaces between the 24 VDC signals 307 and logic level signals (e.g., 335,337) at the control circuit 276. The A/D converters 282,284,286,288,290,292 provide to the control circuit 276 and its μP 126 digital versions of an optional analog speed reference 308, a voltage from a capacitor bank voltage sensor (VC) 310, the voltage of sensor VT1 244 of FIG. 3, the current of sensor CT2 122, the current of sensor CT3 124, and a voltage of thermistor 312 on a heat sink 314 for the six IGBT transistors Q1P,Q1N,Q2P,Q2N,Q3P,Q3N and six anti-parallel diodes D1P,D1N,D2P,D2N,D3P,D3N of FIG. 3.

The gate drive circuits 268 have six outputs 316 for drive signals 318,320,232,234,322,216 for the IGBT transistors Q1P,Q1N,Q2P,Q2N,Q3P,Q3N, respectively, of FIG. 3. The I/F 294 has an output 324 to drive a pre-charge contactor coil (P) 326. The logic interface 272 has two outputs 328,330 to drive a main contactor coil (M) 332 and the DB contactor coil (DB) 266.

Figure 13:
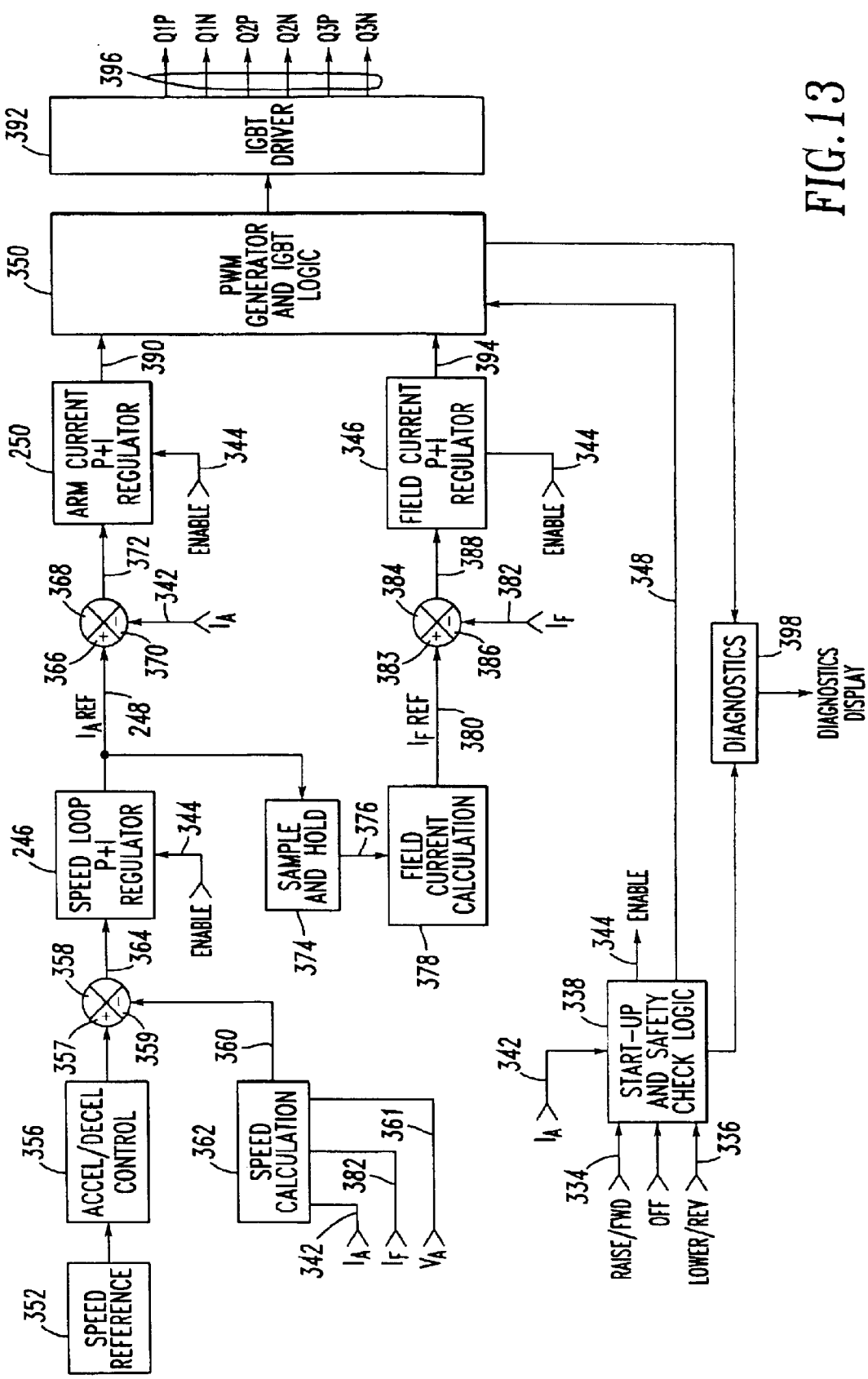
FIG. 13 is a software block diagram for the DC/DC controller of FIG. 12.
Figure 14:
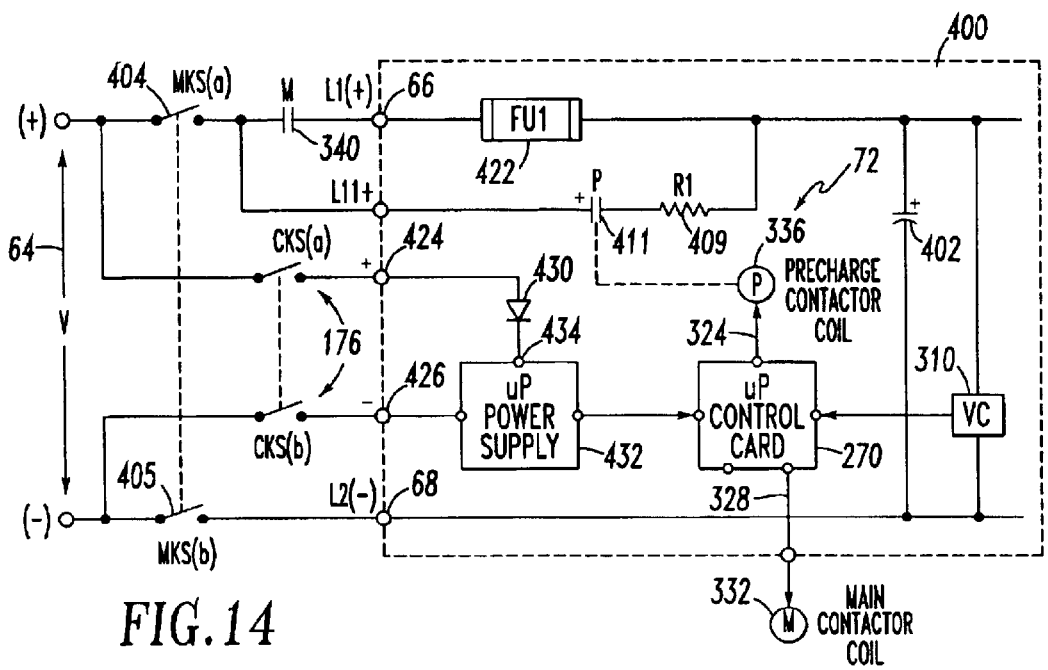
FIG. 14 is a block diagram in schematic form of the fail-safe capacitor soft-charge circuit for the DC/DC converter of FIG. 3.

FIG. 13 shows various software modules employed by the μP 126 of FIG. 12 to provide various control strategies as disclosed above. In response to a hoist RAISE command 334 (or FORWARD command in the case of a travel motion) as input at 335 of FIG. 12, or LOWER command 336 (or REVERSE command in the case of a travel motion) as input at 337 of FIG. 12, a start-up and safety check module 338 performs a start-up routine (discussed below in connection with FIG. 15). Upon determining that main DC contactor (M) 340 of FIG. 14 is closed (e.g., if the armature current $I_A$ 342 is above a suitable threshold value; or, alternatively, upon receiving an answer-back signal from an auxiliary contact (not shown)), the module 338 outputs a signal 344 to enable the speed loop (P+I) regulator 246, the armature current (P+I) regulator 250 and a field current (P+I) regulator 346, and a signal 348 to enable a PWM generator and IGBT logic block 350.

A suitable speed reference 352 is input by the operator through the A/D 282 of FIG. 12 for the voltage from the continuously variable analog speed reference 308. Alternatively, any suitable signal may be input such as, for example, a current signal, a 5-stepped voltage signal corresponding to five steps on the operator's master switch 353 on operator's control panel 174, a radio signal (not shown), or a digital signal (not shown) from the serial interface port 304 of FIG. 12 (e.g., from another drive; from a PLC) may be employed. The speed reference signal 352 is input by an acceleration/deceleration control block 356, the output of which is applied to the positive input 357 of summing junction 358. The negative input 359 of summing junction 358 receives an actual speed feedback signal 360 from a speed calculation block 362. The actual speed (S) 360 is calculated as a function of:

$$S = \left(\frac{V_A - I_A R_A}{K I_F}\right) \qquad \text{(Eq. 2)}$$

wherein:
K is a motor constant of the motor 134 of FIG. 3;
$V_A$ is measured (e.g., from sensor 244 of FIG. 3) or suitably calculated armature voltage 361;
$I_F$ is field current 382 (e.g., from sensor 124 of FIG. 3);
$I_A$ is armature current 342 (e.g., from Equation 1); and
$R_A$ is resistance of the armature 136.

The output 364 of the summing junction 358 is input by the speed loop (P+I) regulator 246, which produces the armature current reference $I_A$ REF 248. The current reference signal 248 is applied to the positive input 366 of summing junction 368. The negative input 370 of summing junction 368 receives the armature current $I_A$ value 342. In turn, the output 372 of the summing junction 368 is input by the armature current (P+I) regulator 250.

The current reference signal 248 is also input by a sample and hold block 374, the output 376 of which is input by a field current calculation block 378. The block 378 produces the field current reference $I_F$ REF 380. The current reference signal 380 is applied to the positive input 383 of summing junction 384. The negative input 386 of summing junction 384 receives the field current $I_F$ value 382. In turn, the output 388 of the summing junction 384 is input by the field current (P+I) regulator 346.

The output 390 of armature current (P+I) regulator 250 is applied to the PWM generator and IGBT logic block 350 which, in turn, drives the IGBT Driver block 392 in order to continuously adjust the appropriate IGBTs to provide suitable armature current to satisfy the required operating conditions. Similarly, the output 394 of the field current (P+I) regulator 346 is applied to the PWM generator and IGBT logic block 350 which, in turn, drives the IGBT Driver block 392 in order to continuously adjust the appropriate IGBTs to provide suitable field current to satisfy the required operating conditions.

In response to the applied speed reference signal 352 provided by the operator, the controller 80 responds by continuously adjusting the duty cycles of the IGBTs Q1P, Q1N,Q2P,Q2N,Q3P,Q3N in order to operate the motor 134 at the speed desired within the constraints of the maximum capability of the system. A nested loop structure is employed including the outer speed loop (e.g., speed loop (P+I) regulator 246) and two closely interacting inner current loops (e.g., armature current (P+I) regulator 250 and field current (P+I) regulator 346).

The speed calculation module 362 calculates the speed feedback signal 360 to ensure a flat speed/torque operating characteristic during low speed, light hook hoisting and during other operating conditions where it is desirable to maintain constant hook speed.

The μP 126 of FIG. 12 incorporates the start-up and safety check logic 338 (FIG. 15), determination of the armature voltage 361, speed calculation block 362, armature current control loop 250, and field current control loop 346, as well as variable duty cycle outputs 396 from the IGBT driver block 392 to the IGBTs.

The diagnostics block 398 provides suitable analog and digital output signals to the diagnostics module 274 of FIG. 12 in order to provide a suitable diagnostics display and indicate the state of various input and operating conditions for operating and trouble-shooting procedures.

Figure 15:
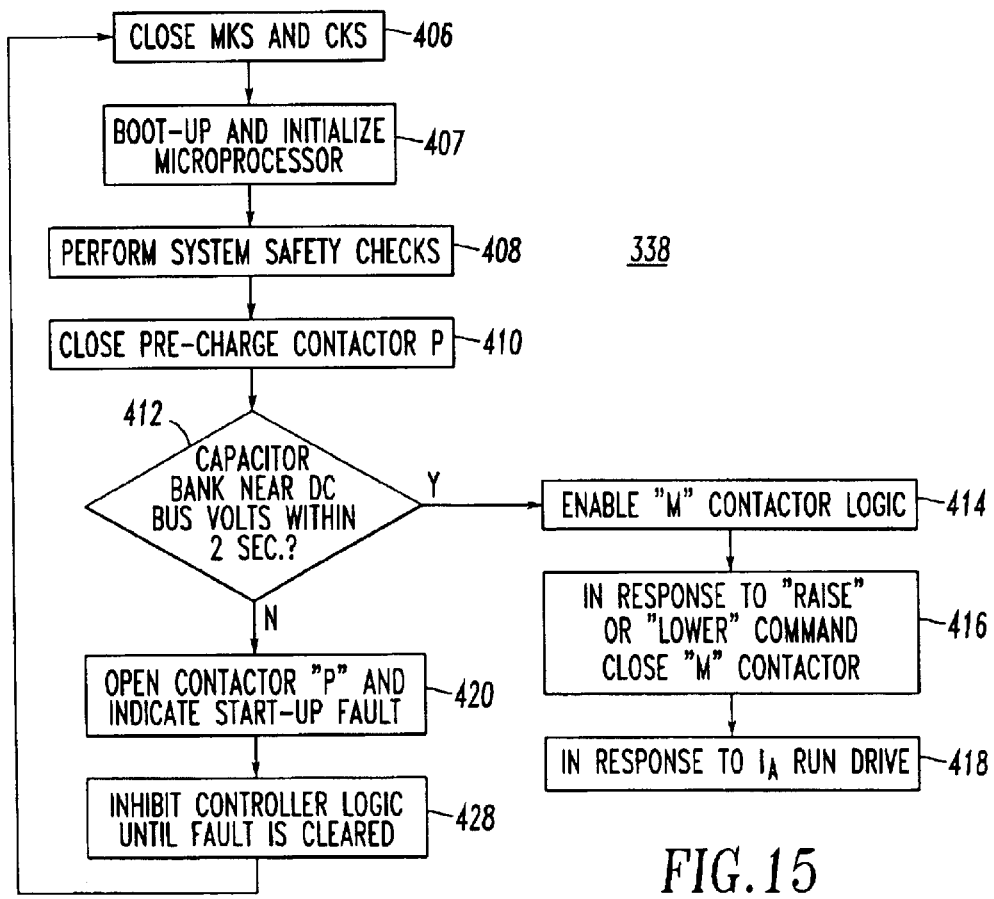
FIG. 15 is a flow chart for use with the soft-charge resistor protection circuit functions and start-up processes for the DC/DC controller of FIG. 12 and the fail-safe capacitor soft-charge circuit of FIG. 14.

FIG. 14 shows a circuit 400 for fail-safe soft-charging of the capacitor bank 402 of the DC/DC converter 60 of FIG. 3. FIG. 15 shows a flow chart of the start-up logic 338 of FIG. 13 when the μP 126 performs the fail-safe soft-charge function. When the main knife switches MKS(a) 404 and MKS(b) 405 and the control knife switch CKS(a) and CKS(b) 176 close at 406, the μP 126 is initialized, at 407, after which it performs safety checks, at 408, including heat sink over-temperature checks (e.g., based upon the temperature of the heat sink 314 of FIG. 12), and a review of recent attempts to soft-charge the capacitor bank 402 to ensure that resistor R1 409 has not been abused. If these checks confirm a healthy state, then, at 410, the output 324 is asserted, the pre-charge contactor coil (P) 326 is energized, and the DC-rated pilot contact (P) 411 closes to apply charging current to capacitor bank 402 via resistor R1 409. The capacitor bank 402 provides the same function as the capacitor C 70 of FIG. 3. The pilot contactor P 411 is suitably capable of interrupting DC current.

If the semiconductor power circuit of the DC/DC converter 60 of FIG. 3 is healthy and if there are no ground faults in the motor's field 142, then, at 412, the μP 126 monitors the voltage of the capacitor bank 402 via voltage transducer VC 310 for a fixed time (e.g., about 2 second; any suitable value). If the capacitor bank 402 suitably charges up (e.g., to within 90% of the positive DC supply voltage V 64) during this time, then, at 414, the main contactor M 340 is enabled, allowing it to close, at 416, whenever the operator's control (e.g., OFF/Hoist/Lower/Forward/Reverse of the operator's control panel 174 of FIG. 12) is not in the OFF position (e.g., is moved away from zero, a RAISE command is asserted (e.g., signal 335), a LOWER command is asserted (e.g., signal 337)). Such closure is accomplished by asserting output 328 in order to energize the main contactor coil (M) 332 and, thereby, close the contact M 340. The main contactor contact M 340 opens whenever the master switch position is in the neutral or OFF position, conforming to conventional industry safety practices. Finally, upon detection of a suitable value of armature current $I_A$ 342 of FIG. 13, control of the DC/DC converter 60 is commenced at 418.

On the other hand, at 412, should the capacitor bank 402 not suitably charge up within the predefined time period, then there would be a major fault in the power circuit of the DC/DC converter 60 or in external wiring. Hence, the contactor P 411 is opened at 420, thereby saving resistor R1 409 from destruction. Also, the main contactor M 340 would not be enabled in order to save it from potentially damaging currents. Additionally, the main power fuses (e.g., downstream of MKS(a) 404 and MKS(b) 405; upstream of contactor M 340; fuse FU1 422 within the circuit 400 of FIG. 14) would not rupture. Other fuses (not shown) may be employed between the control knife switch CKS(a) and CKS(b) 176 and the positive (+) input 424 and the negative (−) 426 inputs of the circuit 400. Finally, at 428, the logic of the DC/DC controller 80 is inhibited until the fault is cleared. A general fault or alarm signal (not shown) (e.g., output by the μP 126) allows for corrective maintenance action, readying the controller 80 for another start-up attempt at 406.

There is also the possibility that a fault might occur during crane operation, which could cause contactor M 340 to open and impress the full positive DC supply voltage V 64 across the pre-charge resistor R1 409, potentially causing its destruction. To prevent this, the capacitor voltage from the sensor 310 is continuously monitored by the μP 126 and compared against the positive DC supply voltage V 64. Should this voltage drop below 90% of the positive DC supply voltage V 64, then the contactor P 411 is immediately opened and the DC/DC controller 80 is disabled, thereby saving the pre-charge resistor R1 409.

There is a safety advantage to the arrangement of switches 404,405,176 and the main contactor M 340 in that the closing of the CKS switches 176 only allows maintenance personnel to perform controller system checks without applying voltage to the power control circuit of the DC/DC converter 60. This conforms to trouble-shooting procedures already applied to known prior crane controllers employing resistor/contactor technologies.

The circuit 400 further includes a diode 430 and a power supply 432 for the μP 126. The diode 430 is electrically connected in series with the positive (+) input 424 and, thereby, prevents an opposite polarity voltage (e.g., as might occur if CKS(b) were erroneously connected to input 424 and CKS(a) were erroneously connected to input 426). The outputs 324,328 from the module 270 drive the coils 326, 332, respectively, and are disabled in the absence of a suitable positive voltage at power supply input 434. In turn, as a result of insufficient voltage or an improper voltage polarity, those coils 326,332 are not energized and the corresponding contacts 411,340, respectively, are opened.

Figure 16:
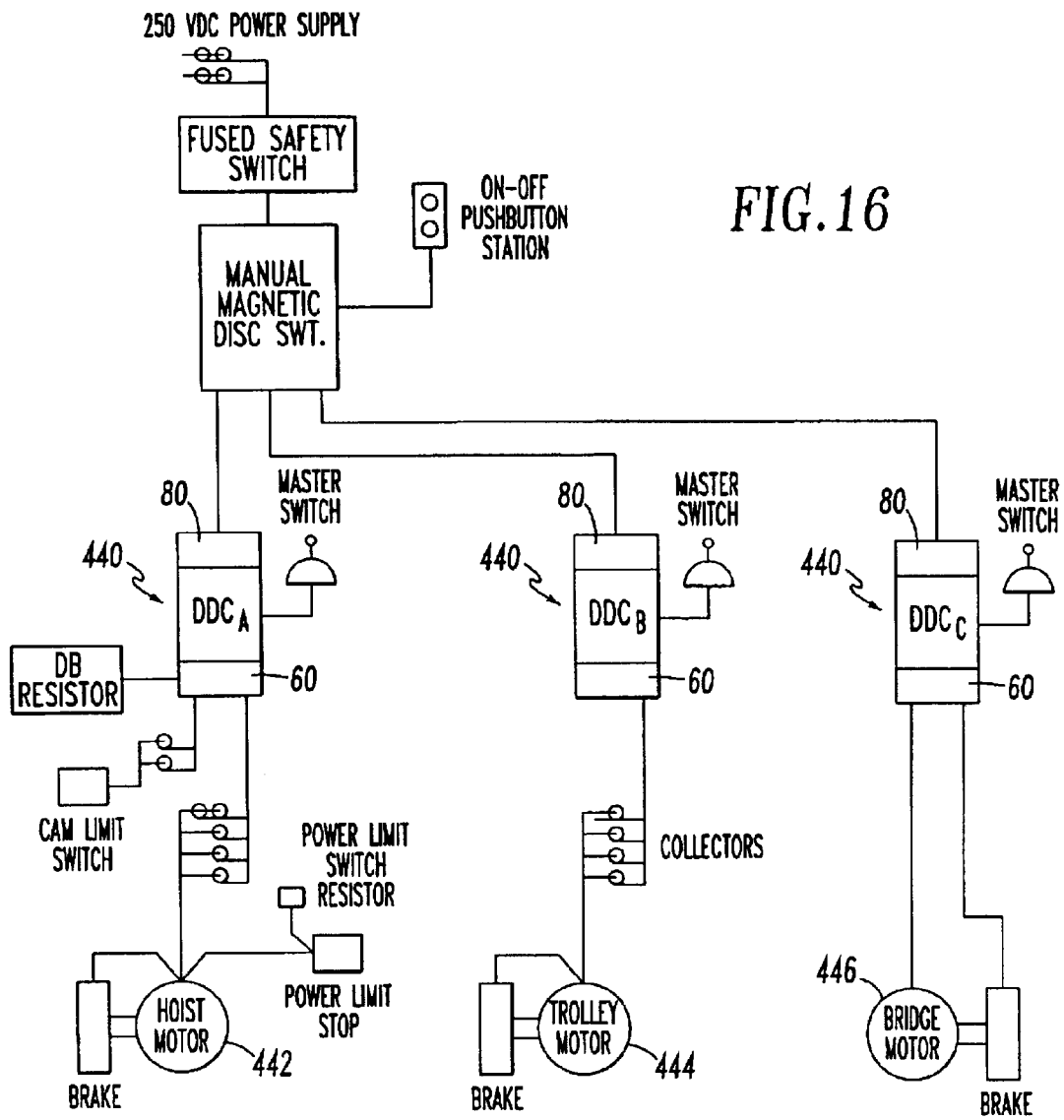
FIG. 16 is a block diagram in schematic form of three DC/DC controllers of FIG. 12, each of which includes the DC/DC converter of FIG. 3.

Furthermore, in multi-motor crane drive applications, such as duplex (two motor) and quadruplex (four motor) systems, employing two and four crane drives, respectively, the exemplary DC/DC controller 80 allows all other such controllers of a multi-motor system (for example, as shown in FIG. 16) to be switched from a single control knife switch (CKS), such as 176, and have the ability to isolate a faulty drive by simply disabling its main knife switch (MKS) 404,405 and associated main contactor M 340.

As shown in FIG. 16, each of the three exemplary digital drive controllers (DDCs) 440 includes the DC/DC converter 60 of FIG. 3 and the DC/DC controller 80 of FIG. 12. The first DDC A is employed to power and control a hoist motor 442, the second DDC B is employed to power and control a trolley motor 444, and the third DDC C is employed to power and control a bridge motor 446.

FIG. 17 shows the DC/DC converter 60 of FIG. 3 electrically connected to a DC compound motor 450 including an armature 452 and two field windings 454,456. For convenience of reference, various limit switches and braking components are not shown.

Using IGBTs and appropriate voltage and current transducers, the DC/DC controller 80 provides independent armature and field control featuring a nested loop structure including a single speed control loop 246 and separately controllable armature and field current control loops 250, 346. A speed calculator 362 employs armature voltage and current, as well as field current feedback, to provide sensor-less speed feedback for DC wound motor applications, and provides improved speed/load regulation performance for shunt wound motors, compared to voltage feedback only operation of DC shunt wound motors.

The invention is applicable to crane hoist and travel motion control and can be applied to moving hoist platforms using industry standard four shoes sliding on collector rails, without any modifications to the components on the hoist platform. Of particular importance is the ability to provide good light hook speed hoisting control using common DC series wound DC motors without the use of motor-mounted speed-sensing devices and without limiting the crane's ability to provide high empty hook speeds during hoisting or lowering. Independent field control is maintained during dynamic as well as powered lowering without the use of power resistors to provide control of the DC series wound hoist motor, thus providing greater operating efficiency than any known prior crane control system for DC series wound hoist motors. During dynamic lowering, reverse torque is created by using regenerative braking into a receptive power supply. Similarly, travel motion direction change is accomplished smoothly using regenerative braking into a receptive power supply and is achieved without the use of a power resistor in the power control circuit.

The exemplary DC/DC controller 80 is useful for unidirectional and reversible motion applications, and is most advantageous for reversible applications. The DC/DC controller controls the exemplary DC/DC converter 60, which provides improved control of DC motors in reversing drive applications.

The exemplary DC/DC controller provides a standard universal converter for four-quadrant operation of a drive system incorporating DC series, shunt or compound wound motors for various applications (e.g., cranes; electric vehicles; lifts; moving hoist platforms employing industry standard four shoes sliding on collector rails) powered from a DC source (e.g., rectified AC; battery; fuel cell; DC generator; other suitable DC source).

The exemplary DC/DC controller controls a configurable DC/DC converter capable of causing a DC motor (e.g., DC series, compound or shunt wound motors) to produce infinitely variable speed or torque using analog voltage or current inputs.

The exemplary DC/DC controller is formatted for any crane motion, with the connections of the DC/DC converter being configured to be compatible with the existing four-terminal sliding shoe/collector or power connection convention. Furthermore, the DC/DC converter is capable of controlling the hoist motion without modifying any of the remote mounted existing hoist assembly components or layout.

The exemplary DC/DC converter may be employed for crane applications where the basic power circuit configuration is the same for both hoist and travel motions.

The exemplary DC/DC converter may be employed for crane hoist duty which is capable of good speed regulation during light hook conditions without employing motor-mounted speed feedback devices, yet still is capable of providing high empty hook speed if demanded by the crane operator. The DC/DC controller incorporates load-dependant field control during low speed lowering by automatically matching armature current to field current in order to prevent excessive field currents that exist in the present technology.

The exemplary DC/DC converter preferably eliminates all load-breaking contactors and, specifically, the electro-mechanical switching devices used according to known prior resistor/contactor and solid state art.

The exemplary DC/DC controller for crane hoist duty limits armature voltage during high speed lowering to not more than 110% of positive DC supply voltage, without compromising hoist performance.

The exemplary DC/DC controller for crane hoist and travel duty is configured to incorporate the known safety practice of having the main DC supply contactor open whenever the operator returns his Master Control to the "neutral" or "off" position.

The exemplary DC/DC controller for crane travel motions incorporates regenerative braking during commanded slow-down and reversing operation to provide operationally the same effect as "plug braking" but without causing excessive motor current, and without the requirement of a resistor and its electro-mechanical switch as is incorporated in known prior art, with regenerative braking current returned to a receptive power supply.

The exemplary DC/DC controller microprocessor preferably provides a common per unit software algorithm to control a wide range of crane motion or frame size of DC crane motors.

The exemplary DC/DC controller preferably controls two, four, or other configurations of plural motors employed on crane motions in series, series parallel, or parallel connection. Preferably, each of the plural parallel motor power circuits has a complete isolation capability, which allows running of the crane motion with any combination of the remaining good motor circuits.

The exemplary DC/DC controller preferably provides control of all crane hoisting modes including all lowering modes and travel reversing motions without using resistors, except for self-generated dynamic lowering caused by a power failure where rotational energy is dissipated in a resistor, with regenerative energy during lowering while power is available being returned to a receptive DC power supply.

The exemplary DC/DC controller preferably provides overriding speed protection of the DC series, compound or shunt motors under all operating conditions, and overcurrent protection for the converter and DC motors.

The exemplary DC/DC controller preferably provides a fail-safe converter capacitor charge-up circuit to prevent the destruction of the charge-up resistor should there be an external ground fault or other fault preventing the capacitor from being charged up when electrical power is first applied to the DC/DC converter. This prevents pre-charge resistor burn-out under fault conditions and the ability to switch the main power contactor, external to the DC/DC converter, only when the master switch is operated.

The exemplary DC/DC controller and converter are preferably backward compatible with known prior crane controllers employing contactors and resistors by configuring its electrical connections to have similar functions in order that there is no need to modify connections or components on existing hoist and travel motion installations.

The exemplary DC/DC controller preferably provides a control algorithm and power connections to existing installations to allow for easy upgrading of older crane installations and to provide for similar maintenance and troubleshooting practices as obtained with known prior art resistor/contactor technology.

The exemplary DC/DC converter preferably provides for rapid decay of series brake current at the end of each operation in order that there is a negligible time delay between motor current cessation and the setting of the brake in order that load sag is minimized.

The exemplary DC/DC converter preferably provides controlled deceleration of the load toward the end of a hoist operation to improve hook load control.

Preferably, the exemplary DC/DC controller allows maintenance personnel to check out the control circuits of the converter without the presence of a DC voltage being applied to the power devices. This allows easy and safe maintenance of the entire converter in a manner similar to trouble-shooting practices applied to known prior crane controllers using resistors and contactors.

The exemplary DC/DC converter is particularly advantageous for crane hoist and travel applications including: (1) the ability to easily upgrade existing installations without modifications to the collector rails and devices on the moving hoist platforms; (2) reduced energy consumption compared to known prior solid-state and resistor/contactor technologies by the total elimination of power resistors in the power control circuit, when used with receptive DC power supplies; (3) greatly reduced volume compared to known prior resistor/contactor technologies; (4) excellent light hook low speed performance during hoisting with DC series wound motors; (5) reduced hoist DC series motor heating especially during lowering compared to known prior technologies; (6) reduced armature voltage generated by DC series hoist motors during high speed high load lowering compared to known prior technologies; (7) improved protection of the controller and motor over-speed, motor overcurrent, motor over-voltage and motor thermal overload protection of the DC motors, and reduction in collector rail current during all modes of operation compared to known prior crane control technologies; (8) reduction of hook sag at the end of a hoist RAISE operation; and (9) control of hook speed at the last stage of a hoist RAISE operation.

The DC/DC converter interfaces a separately excited motor, with automatic transfer between the series-fed and separately excited modes, without interruption of output.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A reversible direct current (DC) motor drive for a DC motor having a speed and a torque, said DC motor including first and second terminals for an armature winding and third and fourth terminals for a field winding, said DC motor operable in at least one of four quadrants including positive speed and positive torque, positive speed and negative torque, negative speed and negative torque, and negative speed and positive torque, said DC motor drive comprising:

at least two input terminals adapted to receive a DC voltage, said input terminals including first and second input terminals;

first and second switches electrically connected in series between said first and second input terminals;

first and second transistors electrically connected in series between said first and second input terminals;

first and second diodes electrically connected in parallel with said first and second transistors, respectively, said first and second transistors having a first polarity, said first and second diodes having an opposite second polarity;

a third diode;

a third transistor electrically connected in series with said third diode, said third transistor having the first polarity, said third diode having the opposite second polarity;

at least three output terminals, said output terminals including a first output terminal electrically interconnected with a first node between said first and second switches, a second output terminal electrically interconnected with a second node between said first and second transistors, and a third output terminal electrically interconnected with a third node between said third diode and said third transistor;

means for determining a voltage between said first and second output terminals;

means for determining a first current flowing between said second node and said second output terminal, and a second current flowing between said third node and said third output terminal;

means for calculating the speed of said DC motor from the determined voltage, the determined first current and the determined second current; and means for controlling said first, second and third transistors and responding to the calculated speed of said DC motor to provide operation of said DC motor in said four quadrants and independent control of said first and second currents.

2. The reversible DC motor drive of claim 1 wherein said means for determining a voltage is a voltage sensor adapted to sense said voltage between said first and second output terminals.

3. The reversible DC motor drive of claim 1 wherein the first and second terminals of said DC motor are electrically interconnected in series with the third and fourth terminals of said DC motor; and wherein said first output terminal is adapted for electrical interconnection with the first terminal of said DC motor, said second output terminal is adapted for electrical interconnection with the second terminal of said DC motor, and said third output terminal is adapted for electrical interconnection with the fourth terminal of said DC motor.

4. The reversible DC motor drive of claim 1 wherein said first and second output terminals are adapted for electrical interconnection with the first and second terminals, respectively, of said DC motor, and said third and fourth output terminals are adapted for electrical interconnection with the third and fourth terminals, respectively, of said DC motor.

5. The reversible DC motor drive of claim 1 wherein said at least three output terminals are four output terminals, with a fourth output terminal electrically interconnected with said first input terminal.

6. The reversible DC motor drive of claim 1 wherein said three output terminals are adapted for electrical interconnection with an external braking contact, a braking resistor, and a four-terminal sliding shoe/collector.

7. The reversible DC motor drive of claim 1 wherein said DC motor is selected from the list comprising: a DC shunt wound motor; a series wound DC motor, and a compound wound motor.

8. The reversible DC motor drive of claim 1 wherein said first, second and third transistors are insulated gate bipolar transistors.

9. The reversible DC motor drive of claim 1 wherein said first and second switches are contactors.

10. The reversible DC motor drive of claim 1 wherein said first and second switches are insulated gate bipolar transistors.

11. The reversible DC motor drive of claim 1 wherein each of said first and second switches is an SCR having an anti-parallel diode.

12. The reversible DC motor drive of claim 1 wherein said means for determining a voltage is a voltage transducer electrically connected between the first and second output terminals.

13. The reversible DC motor drive of claim 1 wherein said means for determining a first current and a second current is a first current transformer operatively associated with the second output terminal and a second current transformer operatively associated with the third output terminal.

14. The reversible DC motor drive of claim 1 wherein said at least two input terminals are adapted to receive said DC voltage from a voltage source which is selected from the list comprising: a DC source; a rectified AC source; a battery; a DC generator; and a fuel cell.

15. The reversible DC motor drive of claim 3 wherein said means for controlling includes means for turning off said first and second transistors, means for closing one of said first and second switches, and means for modulating said third transistor on and off to control the second current between the first output terminal and the third output terminal for the armature and field windings of said DC motor.

16. The reversible DC motor drive of claim 15 wherein said means for modulating includes a modulation cycle having a first time at which said third transistor is turned on, a second time at which said third transistor is turned off, and a third time at which said modulation cycle is repeated, with the second current in the armature and field windings of said DC motor increasing between the first and second times, and with the second current in the armature and field windings of said DC motor decreasing between the second and third times.

17. The reversible DC motor drive of claim 3 wherein said means for controlling includes means for turning on said third transistor, means for opening said first switch, means for closing said second switch, and means for turning said first transistor on and said second transistor off; and wherein the first current flows from the second output terminal and divides to provide the field current and the armature current, with said first current being conducted by one of the first transistor and the second diode.

18. The reversible DC motor drive of claim 17 wherein the field current has a rated value; and wherein said means for controlling employs no resistor to limit said field current to said rated value.

19. The reversible DC motor drive of claim 17 wherein the armature winding has a voltage, which is less than about 110% of said DC voltage.

20. The reversible DC motor drive of claim 3 wherein said means for controlling includes means for controlling the field current with said third transistor; means for closing said first switch, opening said second switch, turning said first transistor off, and turning said second transistor on to provide a forward armature current; and means for closing said second switch, opening said first switch, turning said second transistor off, and turning said first transistor on to provide a reverse armature current.

21. The reversible DC motor drive of claim 3 wherein said means for controlling includes means for closing said first switch, means for opening said second switch, and a modulation cycle having a first time at which said third transistor is turned on, a second time at which said second transistor is turned on and said first transistor is turned off, a third time at which said second transistor is turned off and said first transistor is turned on, a fourth time at which said third transistor is turned off, and a fifth time at which said modulation cycle is repeated.

22. The reversible DC motor drive of claim 21 said means for controlling further includes means for preventing said first transistor and said second transistor from being turned on at the same time.

23. The reversible DC motor drive of claim 21 wherein an electrical field current in said field winding increases between the first time and the second time, decreases between the second time and the third time, increases between the third time and the fourth time, and decreases between the fourth time and the fifth time; and wherein said armature current decreases between the first time and the second time, increases between the second time and the third time, and decreases between the third time and the fifth time.

24. The reversible DC motor drive of claim 21 wherein said armature winding has an armature voltage; wherein said field winding has a field voltage; and wherein the sum of said armature and field voltages is less than said DC voltage.

25. The reversible DC motor drive of claim 3 wherein said means for controlling includes means for opening said first switch, means for closing said second switch, and a modulation cycle having a first time at which said first transistor is turned on and said second transistor is turned off, a second time at which said third transistor is turned off, a third time at which said third transistor is turned on, a fourth time at which said first transistor is turned off and said second transistor is turned on, and a fifth time at which said modulation cycle is repeated.

26. The reversible DC motor drive of claim 25 said means for controlling further includes means for preventing said first transistor and said second transistor from being turned on at the same time.

27. The reversible DC motor drive of claim 25 wherein an electrical field current in said field winding increases between the first time and the second time, decreases between the second time and the third time, increases between the third time and the fourth time, and decreases between the fourth time and the fifth time; and wherein an electrical armature current in said armature winding decreases between the first time and the fourth time, and increases between the fourth time and the fifth time.

28. The reversible DC motor drive of claim 25 wherein said armature winding has an armature voltage; wherein said field winding has a field voltage; and wherein the sum of said armature and field voltages is less than said DC voltage.

29. The reversible DC motor drive of claim 25 wherein said armature current is positive.

30. The reversible DC motor drive of claim 25 wherein said armature current is negative.

31. The reversible DC motor drive of claim 1 wherein said means for controlling includes means for reversing said DC motor between a first one of said four quadrants having positive speed and positive torque and a third one of said four quadrants having negative speed and negative torque.

32. The reversible DC motor drive of claim 31 wherein said means for controlling further includes means for braking said DC motor in a second one of said four quadrants having positive speed and negative torque.

33. The reversible DC motor drive of claim 31 wherein said means for controlling further includes means for braking said DC motor in a fourth one of said four quadrants having negative speed and positive torque.

34. The reversible DC motor drive of claim 1 wherein said means for controlling includes means for reversing said DC motor between a first one of said four quadrants having positive speed and positive torque and a second one of said four quadrants having positive speed and negative torque.

35. The reversible DC motor drive of claim 1 wherein said third diode provides a freewheel path for the second current entering the third output terminal when the third transistor is not conducting.

36. A reversible direct current (DC) motor drive for a DC motor having a speed, said DC motor including first and second terminals for an armature winding having an armature voltage and an armature current, said DC motor also including third and fourth terminals for a field winding having a field voltage and a field current, said DC motor drive comprising:

a DC/DC converter having a DC input and at least three output terminals, said output terminals including a first output terminal having a first pulsed DC voltage with a first DC voltage value, a second output terminal having a second pulsed DC voltage with a second DC voltage value, and a third output terminal having a third pulsed DC voltage with a third DC voltage value, said first and second output terminals adapted for electrical interconnection with the first and second terminals of said DC motor, said third output terminal adapted for electrical interconnection with the fourth terminal of said DC motor;

means for determining the armature voltage of the armature winding of said DC motor;

means for determining the field current of the field winding of said DC motor;

means for determining the armature current of the armature winding of said DC motor;

means for calculating the speed of said DC motor from the determined armature voltage, the determined field current and the determined armature current;

means for providing a speed reference; and means for controlling said DC/DC converter responsive to the calculated speed of said DC motor and said speed reference in order to independently control the first, second and third DC voltage values;

wherein K is a motor constant of said DC motor; wherein $V_A$ is the determined armature voltage of said DC motor; wherein $I_F$ is the determined field current of said DC motor; wherein $I_A$ is the determined armature current of said DC motor; wherein the armature of said DC motor has a resistance, $R_A$; and wherein said means for calculating the speed of said DC motor calculates said speed as a function of:

$$\left(\frac{V_A - I_A R_A}{K I_F}\right).$$

37. A reversible direct current (DC) motor drive for a DC motor having a speed, said DC motor including first and second terminals for an armature winding having an armature voltage and an armature current, said DC motor also including third and fourth terminals for a field winding having a field voltage and a field current, said DC motor drive comprising:

a DC/DC converter having a DC input and at least three output terminals, said output terminals including a first output terminal having a first pulsed DC voltage with a first DC voltage value, a second output terminal having a second pulsed DC voltage with a second DC voltage value, and a third output terminal having a third pulsed DC voltage with a third DC voltage value, said first and second output terminals adapted for electrical interconnection with the first and second terminals of said DC motor, said third output terminal adapted for electrical interconnection with the fourth terminal of said DC motor;

means for determining the armature voltage of the armature winding of said DC motor;

means for determining the field current of the field winding of said DC motor;

means for determining the armature current of the armature winding of said DC motor;

means for calculating the speed of said DC motor from the determined armature voltage, the determined field current and the determined armature current;

means for providing a speed reference; and means for controlling said DC/DC converter responsive to the calculated speed of said DC motor and said speed reference in order to independently control the first, second and third DC voltage values;

wherein said DC/DC converter includes four output terminals, including the first output terminal, the second output terminal, the third output terminal and a fourth output terminal; wherein said first and second output terminals are adapted for electrical connection with the armature winding of said DC motor; and wherein said third and fourth output terminals are adapted for electrical connection with the field winding of said DC motor.

38. The reversible DC motor drive of claim 37 wherein said DC motor produces torque in a first direction for forward travel when current flows from the first to the second output terminals in the armature winding and from the third to the fourth output terminals in the field winding; and wherein said DC motor produces torque in an opposite second direction for reverse travel when current flows from the second to the first output terminals in the armature winding, and from the third to the fourth output terminals in the field winding.

39. A reversible direct current (DC) motor drive for a DC motor having a speed and a torque, said DC motor including first and second terminals for an armature winding and third and fourth terminals for a field winding, said DC motor operable in at least one of four quadrants including positive speed and positive torque, positive speed and negative torque, negative speed and negative torque, and negative speed and positive torque, said DC motor drive comprising:

at least two input terminals adapted to receive a DC voltage, said input terminals including first and second input terminals;

first and second switches electrically connected in series between said first and second input terminals;

first and second transistors electrically connected in series between said first and second input terminals;

first and second diodes electrically connected in parallel with said first and second transistors, respectively, said first and second transistors having a first polarity, said first and second diodes having an opposite second polarity;

a third diode;

a third transistor electrically connected in series with said third diode, said third transistor having the first polarity, said third diode having the opposite second polarity;

at least three output terminals, said output terminals including a first output terminal electrically interconnected with a first node between said first and second switches, a second output terminal electrically interconnected with a second node between said first and second transistors, and a third output terminal electrically interconnected with a third node between said third diode and said third transistor;

means for determining a voltage between said first and second output terminals;

means for determining a first current and a second current, said first current flowing between one of said first node and said first output terminal, said second node and said second output terminal, and said third node and said third output terminal, and said second current flowing between a different one of said first node and said first output terminal, said second node and said second output terminal, and said third node and said third output terminal;

means for calculating the speed of said DC motor from the determined voltage, the determined first current and the determined second current; and means for controlling said first, second and third transistors and responding to the calculated speed of said DC motor to provide operation of said DC motor in said four quadrants and independent control of said first and second currents.

* * * * *